(12) United States Patent
de Lucas

(10) Patent No.: US 11,875,443 B2
(45) Date of Patent: Jan. 16, 2024

(54) GRAPHICS PROCESSING SYSTEM AND METHOD OF RENDERING

(71) Applicant: Imagination Technologies Limited, Kings Langley (GB)

(72) Inventor: Enrique de Lucas, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/854,277

(22) Filed: Jun. 30, 2022

(65) Prior Publication Data

US 2023/0012814 A1 Jan. 19, 2023

(30) Foreign Application Priority Data

Jun. 30, 2021 (GB) ..................................... 2109482
Jun. 30, 2021 (GB) ..................................... 2109483

(51) Int. Cl.
*G06T 15/00* (2011.01)
*G06T 15/40* (2011.01)
*G06T 17/20* (2006.01)

(52) U.S. Cl.
CPC ............ *G06T 15/005* (2013.01); *G06T 15/40* (2013.01); *G06T 17/20* (2013.01)

(58) Field of Classification Search
None
See application file for complete search history.

(56) References Cited

U.S. PATENT DOCUMENTS

| 10,235,799 | B2 |   | 3/2019  | Nevraev et al. |
|---|---|---|---|---|
| 10,249,085 | B2 | * | 4/2019  | Howson ................. G06T 15/40 |
| 11,250,611 | B1 | * | 2/2022  | Ruud ..................... G06T 15/80 |
| 2015/0332481 | A1 | * | 11/2015 | Rosasco .................. G06T 3/40 345/660 |
| 2015/0348306 | A1 | * | 12/2015 | Yang ...................... G06T 15/80 345/420 |
| 2019/0005712 | A1 |   | 1/2019  | Nevraev et al. |

(Continued)

FOREIGN PATENT DOCUMENTS

WO 2019/147929 A1 8/2019

*Primary Examiner* — Andrew G Yang
(74) *Attorney, Agent, or Firm* — Potomac Law Group, PLLC; Vincent M DeLuca

(57) ABSTRACT

A method of rendering a scene formed by primitives in a graphics processing system. For a sequence of primitives, a pipeline fragment shading rate value and a primitive fragment shading rate value for a primitive are combined to produce a combined fragment shading rate value for the primitive. Fragment shading rate data representing the combined fragment shading rate value for the primitive is stored and data identifying the primitive is associated with the fragment shading rate data. For a subsequent primitive, it is determined whether or not a combined fragment shading rate value for the subsequent primitive is the same as for the preceding primitive. If it is the same, data identifying the subsequent primitive is associated with the fragment shading rate data that the data identifying the preceding primitive is associated with. If it is not the same, further fragment shading rate data representing the combined fragment shading rate value for the subsequent primitive is stored and data identifying the subsequent primitive is associated with the further fragment shading rate data.

19 Claims, 11 Drawing Sheets

(56) References Cited

U.S. PATENT DOCUMENTS

| | | |
|---|---|---|
| 2020/0020153 A1 | 1/2020 | Sathe |
| 2020/0051290 A1* | 2/2020 | Yang ........................ G06T 13/20 |
| 2021/0192827 A1 | 6/2021 | Saleh et al. |
| 2021/0383600 A1* | 12/2021 | Uhrenholt ............. G06F 9/4843 |
| 2021/0407183 A1* | 12/2021 | Guo ........................ G09G 5/363 |

* cited by examiner

GRAPHICS PROCESSING SYSTEM AND METHOD OF RENDERING

TECHNICAL FIELD

The present disclosure relates to graphics processing systems, in particular those implementing variable fragment shading rates.

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are sections of the rendering space, and may have any suitable shape, but are typically rectangular (where the term "rectangular" includes square). As is known in the art, there are many benefits to subdividing the rendering space into tile sections. For example, subdividing the rendering space into tile sections allows an image to be rendered in a tile-by-tile manner, wherein graphics data for a tile can be temporarily stored "on-chip" during the rendering of the tile, thereby reducing the amount of data transferred between a system memory and a chip on which a graphics processing unit (GPU) of the graphics processing system is implemented.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase (e.g. a rasterisation phase), a particular tile can be rendered by processing those graphics data items which are determined to be present within that tile (without needing to process graphics data items which were determined in the geometry processing phase to not be present within the particular tile).

When rendering an image, it is known that the render may use more sample points than the number of pixels with which an output image will be represented. This oversampling can be useful for anti-aliasing purposes, and is typically specified to a graphics processing pipeline as a constant (i.e. a single anti-aliasing rate) for the entire image.

More recently, the idea of variable fragment shading rates has been considered. Here, a render may use fewer shading sample points than the number of pixels (which may be termed 'subsampling') or more shading sample points than the number of pixels (which may be termed 'multisampling'), depending on the situation. Moreover, different parts of the same image may have different fragment shading rates. For example, higher sampling rates may still be useful for anti-aliasing purposes in parts of great detail or focus, but lower shading sampling rates may reduce the processing in rendering areas of uniformity or low importance parts of the image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect, there is provided a method of rendering a scene formed by primitives in a graphics processing system, the method comprising, for a sequence of primitives, one or more of: combining a pipeline fragment shading rate value and a primitive fragment shading rate value for a primitive to produce a combined fragment shading rate value for the primitive; storing fragment shading rate data representing the combined fragment shading rate value for the primitive and associating data identifying the primitive with the fragment shading rate data; determining, for a subsequent primitive, if a combined fragment shading rate value for the subsequent primitive is the same as for the preceding primitive, and if the combined fragment shading rate value for the subsequent primitive is the same as for the preceding primitive, associating data identifying the subsequent primitive with the fragment shading rate data that the data identifying the preceding primitive is associated with, and repeating the determining step for a next subsequent primitive, if there is one; or, if the combined fragment shading rate value for the subsequent primitive is not the same as for the preceding primitive, storing further fragment shading rate data representing the combined fragment shading rate value for the subsequent primitive and associating data identifying the subsequent primitive with the further fragment shading rate data; and repeating the determining step for a next subsequent primitive, if there is one.

Optionally, the primitives in the sequence of primitives have the same pipeline fragment shading rate value, and the step of determining further comprises identifying that the primitive fragment shading rate value is different for the subsequent primitive and the preceding primitive.

Optionally, the step of determining further comprises calculating a combined fragment shading rate value for the subsequent primitive, and further optionally the step of determining further checking if the calculated combined fragment shading rate value for the subsequent primitive differs from the combined fragment shading rate value for the preceding primitive.

Optionally, a combined shading rate value is calculated from a pipeline fragment shading rate value and primitive fragment shading rate value by any one of the following combination operations: selecting a particular one of the pipeline fragment shading rate value and primitive fragment shading rate value, selecting the maximum or minimum of the pipeline fragment shading rate and the primitive fragment shading rate values, multiplying together the pipeline fragment shading rate value and the primitive fragment shading rate value, or performing any other mathematical operation on the pipeline fragment shading rate value and primitive fragment shading rate value. Optionally, different combination operations may be used for different primitives to calculate their respective combined fragment shading rate value.

Optionally, storing fragment shading rate data (or further fragment shading rate data) comprises creating a primitive block and storing the fragment shading rate data (or further fragment shading rate data) as header data in the primitive block. Optionally, associating data identifying a primitive with the fragment shading rate data comprises storing data identifying the primitive in the primitive block having the fragment shading rate data as header data.

Optionally, the graphics processing system is configured to use a rendering space that is subdivided into a plurality of regions. Optionally, the primitive and subsequent primitives at least partially cover a same one of the plurality of regions.

According to a second aspect, there is provided a graphics processing system configured to render a scene formed by primitives, wherein the graphics processing system comprises geometry processing logic configured to: combine a pipeline fragment shading rate value and a primitive fragment shading rate value for a primitive in a sequence of primitives to produce a combined fragment shading rate value for the primitive; store fragment shading rate data representing the combined fragment shading rate value for the primitive and associating data identifying the primitive with the fragment shading rate data; determine, for a subsequent primitive, if a combined fragment shading rate value for the subsequent primitive is the same as for the preceding primitive, and if the combined fragment shading rate value for the subsequent primitive is the same as for the preceding primitive, associate data identifying the subsequent primitive with the fragment shading rate data that the data identifying the preceding primitive is associated with, and repeat the determining step for a next subsequent primitive, if there is one; or, if the combined fragment shading rate value for the subsequent primitive is not the same as for the preceding primitive, store further fragment shading rate data representing the combined fragment shading rate value for the subsequent primitive and associate data identifying the subsequent primitive with the further fragment shading rate data; and repeat the determining step for a next subsequent primitive, if there is one.

Optionally, the primitives in the sequence of primitives have the same pipeline fragment shading rate value, and wherein the processing logic configured to determine if a combined fragment shading rate value for the subsequent primitive is the same as for the preceding primitive further comprises processing logic configured to identify that the primitive fragment shading rate value is different for the subsequent primitive and the preceding primitive.

Optionally, the processing logic configured to determine if a combined fragment shading rate value for the subsequent primitive is the same as for the preceding primitive further comprises processing logic configured to calculate a combined fragment shading rate value for the subsequent primitive. Optionally, the processing logic configured to determine if a combined fragment shading rate value for the subsequent primitive is the same as for the preceding primitive further comprises processing logic configured to check if the calculated combined fragment shading rate value for the subsequent primitive differs from the combined fragment shading rate value for the preceding primitive.

Optionally, the processing logic calculates a combined shading rate value from a pipeline fragment shading rate value and primitive fragment shading rate value by any one of the following combination operations: selecting a particular one of the pipeline fragment shading rate value and primitive fragment shading rate value, selecting the maximum or minimum of the pipeline fragment shading rate and the primitive fragment shading rate values, multiplying together the pipeline fragment shading rate value and the primitive fragment shading rate value, or performing any other mathematical operation on the pipeline fragment shading rate value and primitive fragment shading rate value.

Optionally, the processing logic is configured to allow different combination operations to be used for different primitives to calculate their respective combined fragment shading rate value.

Optionally, the processing logic is configured to store fragment shading rate data (or further fragment shading rate data) by creating a primitive block and storing the fragment shading rate data (or further fragment shading rate data) as header data in the primitive block. Optionally, the processing logic is configured to associate data identifying a primitive with the fragment shading rate data by storing data identifying the primitive in the primitive block having the fragment shading rate data as header data.

Optionally, the graphics processing system is configured to use a rendering space that is subdivided into a plurality of regions. Optionally, wherein the primitive and subsequent primitives at least partially cover a same one of the plurality of regions.

According to a third aspect, there may be provided a graphics processing system configured to perform the method of the first aspect or any of the aforementioned variations.

There is also provided a method of rendering, in a rendering space, a scene formed by primitives in a graphics processing system, the method comprising any of the steps of: a geometry processing phase, comprising the step of: storing fragment shading rate data representing a first fragment shading rate value and associating data identifying a primitive with the fragment shading rate data; and a rendering phase comprising the steps of: retrieving the stored fragment shading rate data and associated data identifying the primitive, obtaining an attachment specifying one or more attachment fragment shading rate values for the rendering space; processing the primitive to derive primitive fragments to be shaded; and for each primitive fragment, combining the first fragment shading rate value for the primitive from which the primitive fragment is derived with an attachment fragment shading rate value from the attachment to produce a resolved combined fragment shading rate value for the respective fragment.

There is also provided a graphics processing system configured to render, in a rendering space, a scene formed by primitives, the system comprising one or more of: geometry processing logic configured to: store fragment shading rate data representing a first fragment shading rate value and associating data identifying a primitive with the fragment shading rate data; and rendering logic configured to: retrieve the stored fragment shading rate data and associated data identifying the primitive, obtain an attachment specifying one or more attachment fragment shading rate values for the rendering space; process the primitive to derive primitive fragments to be shaded; and for each primitive fragment, combine the first fragment shading rate value for the primitive from which the primitive fragment is derived with an attachment fragment shading rate value from the attachment to produce a resolved combined fragment shading rate value for the respective fragment.

The graphics processing system may be embodied in hardware on an integrated circuit. There may be provided a method of manufacturing, at an integrated circuit manufacturing system, the graphics processing system. There may be provided an integrated circuit definition dataset that, when processed in an integrated circuit manufacturing system, configures the system to manufacture the graphics processing system. There may be provided a non-transitory computer readable storage medium having stored thereon a computer readable description of the graphics processing system that, when processed in an integrated circuit manufacturing system, causes the integrated circuit manufacturing system to manufacture an integrated circuit embodying the graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
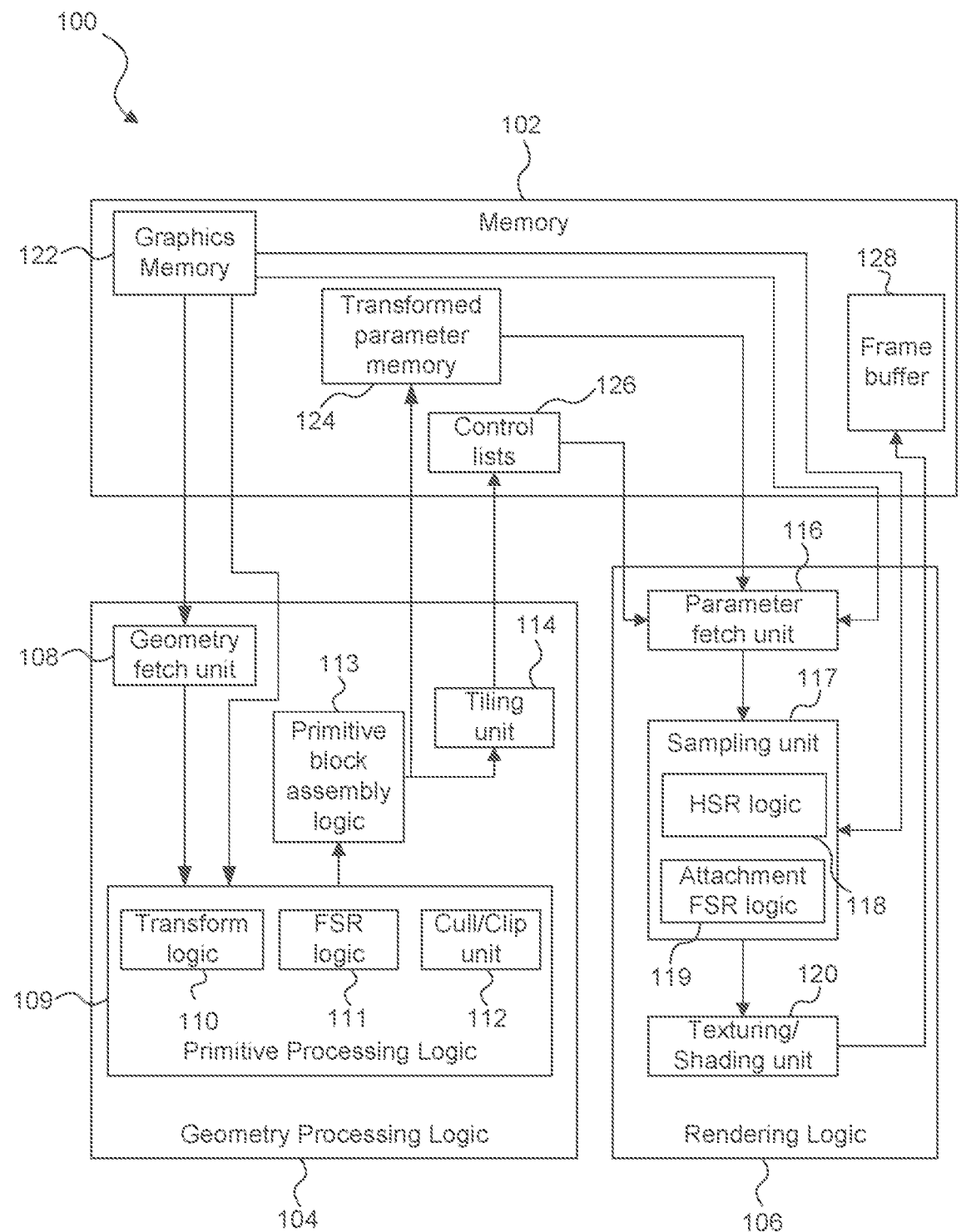
FIG. 1 shows a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

The use of different fragment shading rates, as mentioned above, gives greater flexibility in how fragments are shaded by a graphics processing system. In this document the phrase 'fragment shading rate' (and the abbreviation 'FSR') may be used to denote both a particular technique for providing different rates for performing fragment shading, and to particular fragment shading rate settings or values. The relevant meaning can be distinguished by the associated use of the terms 'technique' or 'value', as appropriate, but in general the relevant meaning will be clear to the skilled person from the context.

Fragment shading rate (FSR) values can be specified to a graphics processing system in a number of ways. One way is to specify FSR values by a 'pipeline' or 'per draw' FSR technique, which associates a particular fragment shading rate value with a particular draw call (and thus for the primitives associated with that draw call). Another way is to specify FSR values by a 'primitive' or 'provoking vertex' FSR technique, which sets a particular fragment shading rate value at a per-primitive granularity. A third way is to specify FSR values by an 'attachment' or 'screen space image' FSR technique, which allows for the fragment shading rate to be specified based on the area of the image being rendered. For example, in the attachment FSR technique the rendering space may be divided into areas, each area (or region) associated with a particular FSR value. The FSR values for the areas of the rendering space may be specified using attachment information defining texels that map to each of the areas of the rendering space, each texel being associated with a FSR value for its corresponding area of the rendering space. Alternatively, a single FSR value may be set for the whole rendering space.

These three different techniques for specifying fragment shading rate values may be used individually or in combination. As such, in practice, having all the different techniques available creates different sources of FSR information that need to be reconciled by a graphics processing system. For example, a particular primitive may be part of a particular draw call and rendered in a particular area of the rendering space. In that example, that particular primitive may be associated with some or all of (i) a pipeline FSR value specified as part of the particular draw call, (ii) a primitive FSR value specified for that particular primitive and (iii) an attachment FSR value specified for the particular area of the rendering space in which the primitive is rendered. Indeed, the situation may be more complicated than that—the primitive may fall across one or more boundaries between areas of pixels that map to different attachment FSR texels, so different sample points within the single primitive may have different FSR values associated with them.

The manner in which the values from different FSR sources are combined, to calculate a resolved combined FSR that will be applied for a primitive (or part thereof), can be specified to the graphics processing system by the instructing application. That is, different types of combination operation are possible. In this sense, a combination operation can be mathematical and/or logical in nature. As such, a logical combination operation may be specified that dictates that a value from a particular one of the FSR sources should be selected for use. For example, a so-called 'keep' combination operation can specify that a first one of a pair of FSR values (e.g. the pipeline fragment shading rate and primitive fragment shading rate) should be selected for use. As another example, a so-called 'replace' combination operation can specify that a second one of a pair of FSR values should be selected for use. Another approach may require a mathematical determination to inform a logical operation performed on the different values from the different FSR sources, to determine the resolved combined FSR. For example, a so-called 'min' combination operation can specify that the minimum FSR value of a set or subset of the FSR values should be selected for use. As another example, a so-called 'max' combination operation can specify that the maximum FSR value of a set or subset of FSR values should be selected for use. In these examples, a mathematical determination (i.e. establishing which is the maximum or minimum value) is used to decide which value to use. Other combination operations may be thought of as more 'purely' mathematical. For example, the use of a so-called 'mul' operation that specifies that a set or subset of the FSR values should be multiplied together to calculate the FSR value for use. It will be understood that in principle any other mathematical operation could be used to combine FSR values from different sources.

It will also be understood that multiple combination operations may be used to combine the values from different sources—e.g. a first combination operation may be used to combine a pipeline FSR value and a primitive FSR value, to produce a first combined FSR value, and a second combination operation (which may be of the same type as the first combination operation, or a different type) may be used to combine an attachment FSR value with the first combined FSR value to produce a second or final combined FSR value.

The present disclosure presents ways in which these different sources of fragment shading rate may be handled and combined efficiently in a graphics processing system.

Embodiments will now be described by way of example only.

General System

FIG. 1 shows an example graphics processing system 100. The example graphics processing system 100 is a tile-based graphics processing system. As mentioned above, a tile-based graphics processing system uses a rendering space which is subdivided into a plurality of tiles. The tiles are sections of the rendering space, and may have any suitable shape, but are typically rectangular (where the term "rectangular" includes square). The tile sections within a rendering space are conventionally the same shape and size.

The system 100 comprises a memory 102, geometry processing logic 104 and rendering logic 106. The geometry processing logic 104 and the rendering logic 106 may be implemented on a GPU and may share some processing resources, as is known in the art. The geometry processing logic 104 comprises a geometry fetch unit 108; primitive processing logic 109, which in turn comprises geometry transform logic 110, FSR logic 111 and a cull/clip unit 112; primitive block assembly logic 113; and a tiling unit 114. The rendering logic 106 comprises a parameter fetch unit 116; a sampling unit 117 comprising hidden surface removal (HSR) logic 118; and a texturing/shading unit 120. The example system 100 is a so-called "deferred rendering" system, because the texturing/shading is performed after the hidden surface removal. However, a tile-based system does not need to be a deferred rendering system, and although the present disclosure uses a tile-based deferred rendering system as an example, the ideas presented are also applicable to non-deferred (known as immediate mode) rendering systems or non-tile-based systems. The memory 102 may be implemented as one or more physical blocks of memory and includes a graphics memory 122; a transformed parameter memory 124; a control lists memory 126; and a frame buffer 128.

Figure 2:
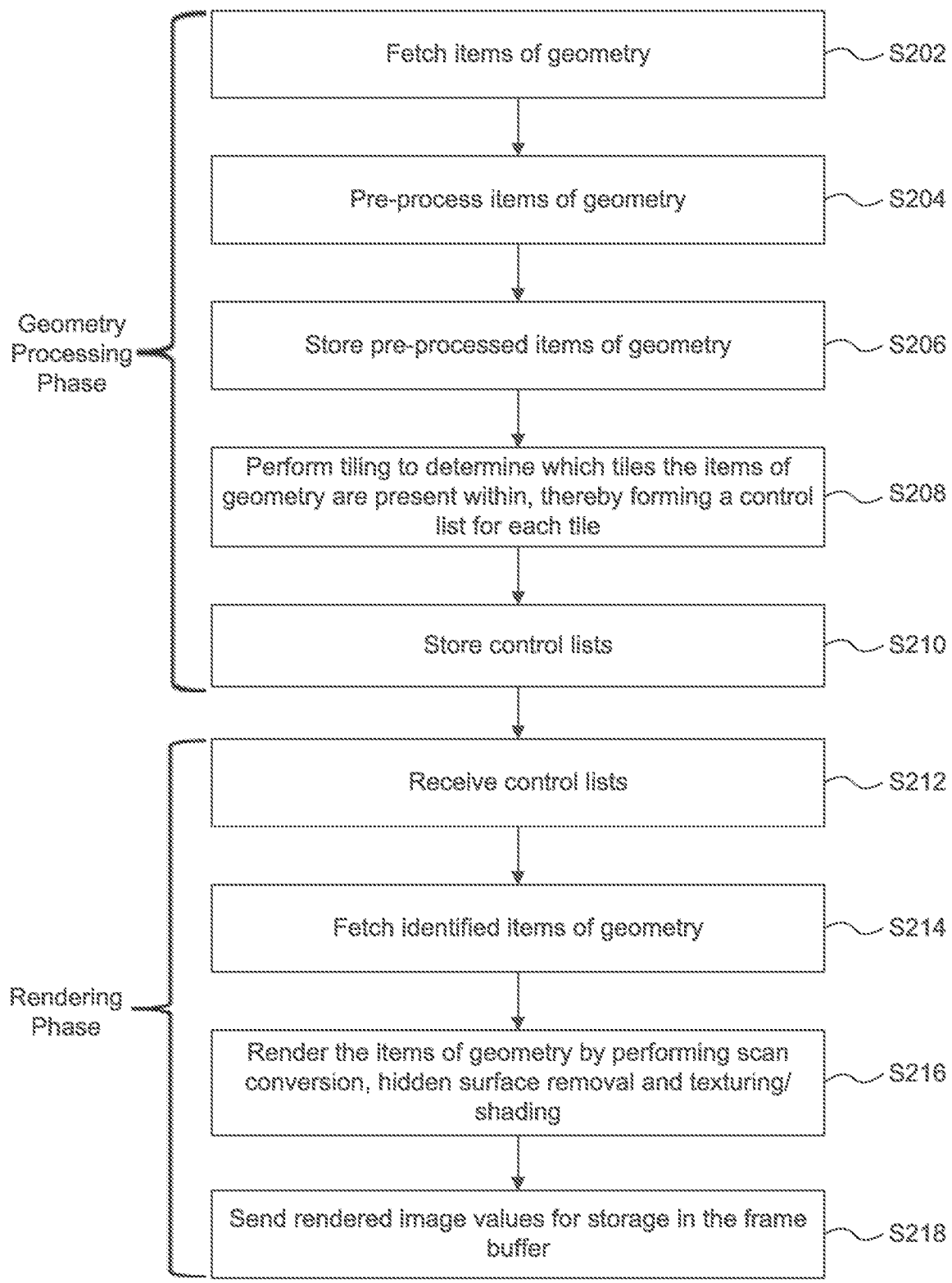
FIG. 2 shows a method that can be implemented by a graphics processing system such as that of FIG. 1.

FIG. 2 shows a flow chart for a method of operating a tile-based rendering system, such as the system shown in FIG. 1. The geometry processing logic 104 performs the geometry processing phase, in which the geometry fetch unit 108 fetches geometry data (e.g. previously received from an application for which the rendering is being performed) from the graphics memory 122 (in step S202) and passes the fetched data to the primitive processing logic 109. The geometry data comprises graphics data items (i.e. items of geometry) which describe geometry to be rendered. For example, the items of geometry may represent geometric shapes, which describe surfaces of structures in the scene. The items of geometry may be in the form of primitives (commonly triangles, but primitives may be other 2D shapes and may also be lines or points to which a texture can be applied). Primitives can be defined by their vertices, and vertex data can be provided describing the vertices, wherein a combination of vertices describes a primitive (e.g. a triangular primitive is defined by vertex data for three vertices). Objects can be composed of one or more such primitives. In some examples, objects can be composed of many thousands, or even millions of such primitives. Scenes typically contain many objects. Items of geometry can also be meshes (formed from a plurality of primitives, such as quads which comprise two triangular primitives which share one edge). Items of geometry may also be patches, wherein a patch is described by control points, and wherein a patch is tessellated to generate a plurality of tessellated primitives.

In step S204 the geometry processing logic 104 pre-processes the items of geometry, e.g. by transforming the items of geometry into screen space, performing vertex shading, performing geometry shading and/or performing tessellation, as appropriate for the respective items of geometry. In particular, the primitive processing logic 109 (and its sub-units) may operate on the items of geometry, and in doing so may make use of state information retrieved from the graphics memory 122. For example, the transform logic 110 in the primitive processing logic 109 may transform the items of geometry into the rendering space and may apply lighting/attribute processing as is known in the art. The resulting data may be passed to the cull/clip unit 112 which may cull and/or clip any geometry which falls outside of a viewing frustum. The remaining transformed items of geometry (e.g. primitives) are provided from the primitive processing logic 109 to the primitive block assembly logic 113 which groups the items of geometry into blocks, also be referred to as "primitive blocks", for storage. A primitive block is a data structure in which data associated with one or more primitives (e.g. the transformed geometry data related thereto) are stored together. For example, each block may comprise up to N primitives, and up to M vertices, where the values of N and M are an implementation design choice. For example, N might be 24 and M might be 16. Each block can be associated with a block ID such that the blocks can be identified and referenced easily. Primitives often share vertices with other primitives, so storing the vertices for primitives in blocks allows the vertex data to be stored once in the block, wherein multiple primitives in the primitive block can reference the same vertex data in the block. In step S206 the primitive blocks with the transformed geometric data items are provided to the memory 102 for storage in the transformed parameter memory 124. The transformed items of geometry and information regarding how they are packed into the primitive blocks are also provided to the tiling unit 114. In step S208, the tiling unit 114 generates control stream data for each of the tiles of the rendering space, wherein the control stream data for a tile includes a control list of identifiers of transformed primitives which are to be used for rendering the tile, i.e. a list of identifiers of transformed primitives which are positioned at least partially within the tile. The collection of control lists of identifiers of transformed primitives for individual tiles may be referred to as a "control stream list" or "display list". In step S210, the control stream data for the tiles is provided to the memory 102 for storage in the control lists memory 126. Therefore, following the geometry processing phase (i.e. after step S210), the transformed primitives to be rendered are stored in the transformed parameter memory 124 and the control stream data indicating which of the transformed primitives are present in each of the tiles is stored in the control lists memory 126. In other words, for given items of geometry, the geometry processing phase is completed and the results of that phase are stored in memory before the rendering phase begins.

In the rendering phase, the rendering logic 106 renders the items of geometry (primitives) in a tile-by-tile manner. In step S212, the parameter fetch unit 116 receives the control stream data for a tile, and in step S214 the parameter fetch unit 116 fetches the indicated transformed primitives from the transformed parameter memory 124, as indicated by the control stream data for the tile. In step S216 the rendering logic 106 renders the fetched primitives by performing sampling on the primitives to determine primitive fragments which represent the primitives at discrete sample points within the tile, and then performing hidden surface removal and texturing/shading on the primitive fragments. In particular, the fetched transformed primitives are provided to the sampling unit 117 (which may also access state information, either from the graphics memory, or stored with the transformed primitives), which performs sampling and determines the primitive fragments to be shaded. As part of determining the primitive fragments to be shaded, the sampling unit 117 uses hidden surface removal (HSR) logic 118 to remove primitive fragments which are hidden (e.g. hidden by other primitive samples). Methods of performing sampling and hidden surface removal are known in the art. Conventionally, the term "fragment" refers to a sample of a primitive at a sampling point, which is to be shaded to assist with determining how to render a pixel of an image (N.B. with anti-aliasing, multiple samples might be shaded to determine how to render a single pixel). However, with variable FSR, there may not be a one to one correspondence between the fragments generated by sampling, and the fragments that are shaded. Therefore, the terms "sampler fragments" (fragments created by sampling primitives) and "shader fragments" (fragments upon which shader programs are executed) are used herein where it is necessary to distinguish between fragments at different units of the GPU. For example, one shader fragment may be processed to determine colour values for more than one sampler fragment. The term "sampling" is used herein to describe the process of generating discrete fragments (sampler fragments) from items of geometry (e.g. primitives), but this process can sometimes be referred to as "rasterisation" or "scan conversion". As mentioned above, the system 100 of FIG. 1 is a deferred rendering system, and so the hidden surface removal is performed before the texturing/shading. However, other systems may render fragments before performing hidden surface removal to determine which fragments are visible in the scene.

Sampler fragments which are not removed by the HSR logic 118 are provided from the sampling unit 117 to the texturing/shading unit 120, where, as shader fragments, texturing and/or shading is applied. The texturing/shading unit 120 is typically configured to efficiently process multiple fragments in parallel. This can be done by determining individual fragments that require the same processing (e.g. need to run the same shader) and treating them as instances of the same task, which are then run in parallel, in a SIMD (single instruction, multiple data) processor for example. To assist with this, in some implementations, sampler fragments from the same primitive may be provided to the texturing/shading unit 120 in so-called 'microtiles', being groups of sampler fragments. A microtile may correspond to, for example, a 4×4 array of sample points corresponding to a particular area of the render space, and thus may include up to 16 sampler fragments (depending on the primitive coverage within the microtile), and thus up to 16 task instances, if each sampler fragment is shaded as one shader fragment. It will be understood that these microtiles are separate to the 'tiles' used in tile-based rendering. As explained above, a tile is a sub-division of the overall render space for which the graphics data can be temporarily stored "on-chip" during the rendering of the tile. A microtile represents the sampling (and optionally hidden surface removal) result of part or all of a particular primitive or primitives in a particular sub-area of a tile, and which is issued from the sampling unit 117 to the texturing/shading unit 120. In other words, several microtiles may represent a single primitive, and many primitives may be present in a single tile.

Although it is not shown in FIG. 1, the texturing/shading unit 120 may receive texture data from the memory 102 in order to apply texturing to the primitive fragments, as is known in the art. The texturing/shading unit 120 may apply further processing to the primitive fragments (e.g. alpha blending and other processes), as is known in the art in order to determine rendered pixel values of an image. The rendering phase is performed for each of the tiles, such that a whole image can be rendered with pixel values for the whole image being determined. In step S218, the rendered pixel values are provided to the memory 102 for storage in the frame buffer 128. The rendered image can then be used in any suitable manner, e.g. displayed on a display, or stored in memory or transmitted to another device, etc.

Interaction of FSR with General System

Figure 3:
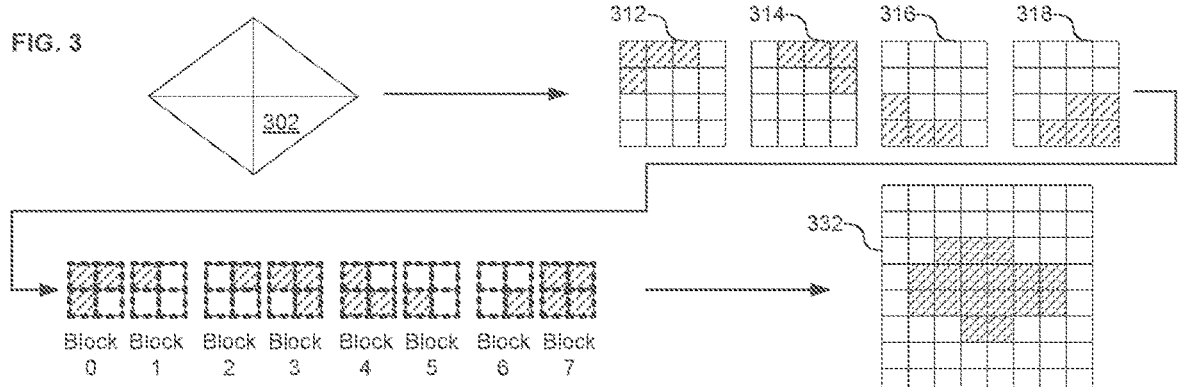
FIG. 3 illustrates how a graphics processing system can process a primitive for shading with a 1×1 fragment shading rate.
Figure 4:
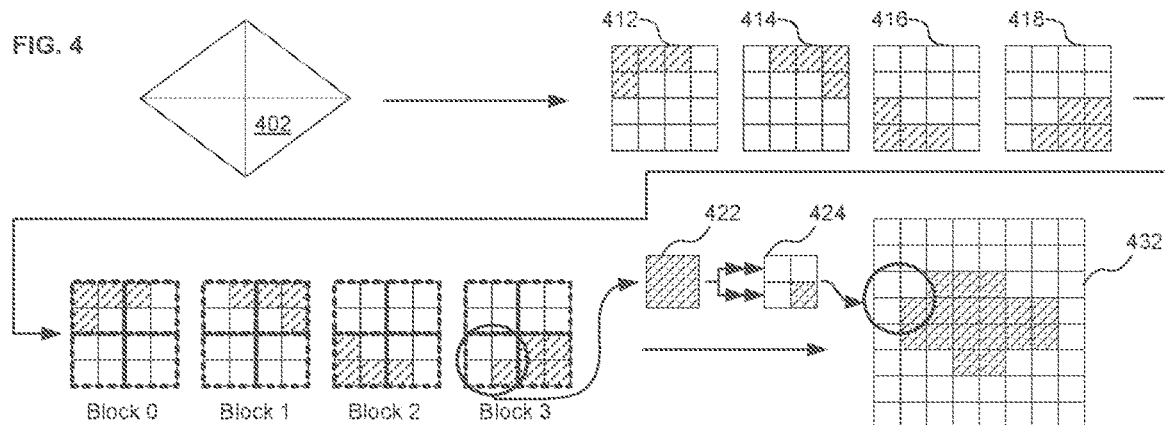
FIG. 4 illustrates how a graphics processing system can process a primitive for shading with a 2×2 fragment shading rate.

FIGS. 3 and 4 illustrate how different fragment shading rate values can affect the workload on the general processing system set out above.

FIG. 3 illustrates the simplest situation of using a 1×1 fragment shading rate value, in which each shader fragment instance corresponds to one sampler fragment. In the example, an object 302 is formed by four right-angular triangle primitives meeting at the centre of the object. During rasterisation, it is determined that the object 302 covers four microtiles 312, 314, 316 & 318 (a microtile being, in this example, a 4×4 array of sampler fragments). In the example, each primitive is in a single microtile for ease of understanding, but this need not be the case in practice. The sampler fragment coverage within each microtile 312, 314, 316 & 318 is determined and indicated by the cross-hatching. In this example, using a 1×1 FSR value, each sampler fragment corresponds to a shader fragment that is shaded individually during rasterisation, and so corresponds to one shading task instance. In this example, the shader fragments are grouped into blocks of instances (Blocks 0 to 7 in FIG. 3) for shading in parallel. In this example, 2×2 instances from the microtiles 312, 314, 316 & 318 are grouped into a block (i.e. Blocks 0 & 1 are derived from microtile 312, Blocks 2 & 3 are derived from microtile 314, Blocks 4 & 5 are derived from microtile 316, Blocks 6 & 7 are derived from microtile 318), but this depends on the configuration of the texturing/shading unit. To emphasise that each shader fragment, despite the block grouping, is shaded individually, a dashed box is shown around each shader fragment in each of the blocks. As such, the contents of each dashed box can be considered to be a task instance to be processed (i.e. shaded) by texturing/shading unit 120. After shading, in this simple example, the shading results can be directly combined to form the output 332 (in which the fact that the fragments have been processed is indicated by use a different cross-hatching).

In contrast, FIG. 4 illustrates the use of a 2×2 fragment shading rate value, in which each shader fragment corresponds to 2×2 sampler fragments. The example begins in a similar way to the FIG. 3 example, with the primitives forming object 402 being determined to cover four microtiles 412, 414, 416 & 418. Again, each microtile 412, 414, 416 & 418 in the example corresponds to an array of 4×4 sample points. Again, the sampler fragment coverage within each microtile is indicated by the cross-hatching. Whilst this 4×4 sampler granularity is retained for coverage information (as will be seen later), the 2×2 fragment shading rate value means that the shader fragments and therefore the task instances for shading are created from 2×2 sets of sampler fragments, which are then grouped into blocks (Blocks 0 to 3 in FIG. 4, with Block 0 being derived from microtile 412, Block 1 being derived from microtile 414, Block 2 being derived from microtile 416, Block 3 being derived from microtile 418). As in FIG. 3, dashed boxes have been shown around each shader fragment in the blocks in FIG. 4. However, in contrast to FIG. 3, it will be seen that the content of each dashed box corresponds to four (that is: 2×2) of the original sampler fragments from microtiles 412, 414, 416 & 418. A single shader task instance is run for each dashed box. Put another way, shader fragments are created with each fragment corresponding to four original sampler fragments, and a single shading task is created for each shader fragment. As shown for one of the dashed boxes from Block 3, this produces a single shading result 422 corresponding to the original sampler fragments for which the task instance was constructed. That single shading result 422 can then be recombined with the coverage information (e.g. as shown in microtiles 412, 414, 416 & 418) to produce a set of appropriately shaded fragments 424 at the same spatial resolution as the original set of 2×2 sampler fragments (in the illustrated example, this results in a single shaded fragment at that resolution). After performing a similar process for each task instance, the shaded fragments can be combined to form the output 432. In other words, although the 'coarser' shader fragment size in this example causes sampler fragments to be grouped together to be shaded, in a way that can also cover sample points which may not actually be covered by the primitive being shaded, the shading results 422 are applied only at the sample positions known to be covered, meaning that the outputs 332 & 432 from FIGS. 3 and 4 are the same in terms of spatial coverage. However, fewer task instances need to be processed to achieve the same (in terms of spatial coverage) output, leading to greater processing efficiency. That can be seen by comparing the number of dashed boxes in the blocks of FIG. 3 compared to those in FIG. 4-FIG. 3 requires 32 dashed boxes (shader task instances) whereas FIG. 4 only requires 16. On the other hand, that processing efficiency comes at a loss of spatial resolution when determining shading results. That is, although the outputs 332 and 432 may have the same spatial coverage, there may be less variation in the shading results within the covered area in the output of FIG. 4. There may not be any difference, depending on the uniformity of the area covered, and it is thus up to the programmer to judge when such loss of spatial resolution in the shading results are an acceptable trade-off for increased processing efficiency.

It will be noted that in FIG. 3, there are some task instances (dashed boxes) in Blocks 0-6 which do not contain any sampler fragments and so do not actually require shading. Similarly, in FIG. 4, there are task instances in Blocks 0-3 which do not contain any sampler fragments that require shading. Such 'empty' or 'helper' instances can be created if the system architecture expects to receive blocks containing a certain number of task instances (e.g. 2×2 instances in the examples presented). Whilst systems such as SIMD systems are most efficient when every instance being processed is 'useful' work, the system can still operate by using such helper instances, and can still operate (overall) more efficiently that a system which does not exploit parallelism.

Different Sources of FSR Information

As mentioned above, there are different possible sources of FSR information, and it is useful to consider the manner in which those different sources of FSR information are submitted to the system.

An application instructing a graphics processing system, such as system 100, to render a scene typically submits instructions to the system as one or more render passes.

Each render pass can include multiple draw calls. A draw call is a mechanism by which the application can submit data for display. A draw call may contain data about how to represent objects (or parts thereof) in a scene to be rendered, by using one or more primitives that are defined by the position of one or more vertices. A draw call also contains state information, and primitives forming an object (or part thereof) may share common state information. Conventionally, this state information may include (but is not limited to) drawing modes, textures and shader programs associated with rendering the relevant primitives.

Each render pass may also be composed of multiple subpasses. Each subpass may reference particular attachments for use in a stage of the render operation of the render pass. As is known in the art, attachments are resources used during rendering. In the context of FSR, an attachment providing attachment FSR values specifies one or more regions of the rendering space (which may be referred to as attachment FSR texels) and a fragment shading rate value associated with each of those regions.

The first two FSR techniques mentioned earlier, namely pipeline FSR and primitive FSR, specify FSR values in relation to the geometry being rendered, whereas the third technique, attachment FSR, specifies FSR values in relation to the rendering space. As such, pipeline FSR and primitive FSR information may be submitted to the graphics processing system as state information associated with particular primitives (i.e. particular groups of primitives in the context of pipeline FSR), whereas attachment FSR information may be submitted as an attachment associated with a particular subpass. The combination operations specifying how the different FSR values from the different sources should be combined may also be provided to the system as state information.

Combining Pipeline FSR and Primitive FSR

Theoretically, when both pipeline and primitive FSR techniques are in use, whilst primitives within a draw call may have the same pipeline FSR value, it is possible that they each have an individual primitive FSR value that varies from one primitive to the next. As both pipeline and primitive FSR information may be provided as primitive state information, a one approach to combining these could be to combine any relevant pipeline FSR with any relevant primitive FSR for each primitive, at some point in a graphics processing system. In a tile-based deferred rendering system such as discussed with respect to FIG. 1, such combination could for example be performed during the geometry phase, whilst determining which primitives fall within which tiles and constructing associated primitive blocks for use in the rasterisation phase. That sort of approach could require calculating an FSR value for each primitive (i.e. by combining the primitive FSR and the pipeline FSR) and storing the FSR value for each primitive. To efficiently store that extra information (which would be sizeable in total, as each primitive would have an associated combined FSR value), it would likely need to be compressed, and that in turn would mean that decompression hardware would need to be added to the rendering logic, for when it came to retrieve the FSR values to determine how to render the primitives. That sort of approach would likely result in a significant increase in data to be stored compared to a system that does not support variable FSR values, and in turn a significant increase in memory bandwidth. That might be acceptable in some systems, but not in others (e.g. in mobile devices, where both memory and memory bandwidth is at a premium). In any case, it would also require substantial changes to the rendering logic as well as the geometry processing logic. Even if the combination were not performed in the geometry phase, it would be necessary to somehow propagate the uncombined FSR values with their associated primitives, which would itself require changes to the pipeline and/or greater storage requirements. This could be done, for example, by storing one primitive FSR value for each primitive in a primitive block (with the primitive block having an associated pipeline FSR value stored as a header). However, a more efficient way of performing this combination of pipeline and primitive FSR has been identified.

That more efficient approach is based on an appreciation that in practice 'high frequency' variation of primitive FSR value from one primitive to the next is unlikely to be the norm. It is more likely that clusters or batches of consecutive primitives have the same primitive FSR value. That is because the primitive FSR technique is likely to be used where the primitives represent geometry that needs a particular level of shading (be that coarser or finer than the rest of the draw call), and those primitives are likely to be submitted to the graphics pipeline together, consecutively. This realisation can be exploited to achieve a more efficient way of combining primitive and pipeline FSR values.

By realising that, e.g. within a set of primitives having the same pipeline FSR value, batches of consecutive primitives submitted to the graphics processing system may have the same primitive FSR value, a method of combining the two sources of FSR values can be employed that does not require calculating a combined FSR value for each individual primitive. For example, for a batch of primitives with the same FSR value in a given draw call, specifying a given pipeline FSR value and a given FSR combination method, the combined primitives and pipeline FSR value will be the same for each primitive. As such, it need only be calculated once (for the first primitive processed). That is, it has been realised that it would only be necessary to calculate a new combined FSR value if a new primitive FSR value is encountered for a primitive being processed (within a set of primitives having the same pipeline FSR value).

This is the approach used in the system of FIG. 1. The FSR logic 111 is configured to receive primitives (i.e. the primitives retrieved by the geometry fetch unit 108 from the graphics memory 122) and their associated FSR information.

For a first primitive in a sequence of primitives having the same pipeline FSR value (and same combination operation), the FSR logic 111 is configured to combine the pipeline and primitive FSR values to calculate a combined fragment shading rate for the first primitive.

For the next primitive (i.e. the second primitive) in the sequence, the FSR logic 111 is configured to determine if the combined fragment shading rate will be the same as for the last primitive. However, this does not necessarily require performing the calculation of the combination. Instead, the FSR logic can be configured to identify that the second primitive has the same primitive FSR value as the first primitive. Having identified this, the logic can determine that the combined FSR value will be the same as for the first primitive, without having to actually perform that combination calculation again, because it is already known that the sequence of primitives being processed have the same pipeline FSR value (and same combination operation). Moreover, the logic can repeat the same determination for each subsequent primitive in the sequence, until a different primitive FSR value is encountered. Each determination that avoids having to calculate a combination saves processing. In view of the total number of primitives being processed by the system, this saving in processing can be significant.

The FSR logic 111 is configured such that, when the logic encounters a primitive in the sequence that has a different (or "new") primitive FSR value compared to the values that went before it, it can calculate a combined pipeline and primitive FSR value for that primitive. That new primitive FSR value can then be used when determining whether the combined FSR value will be the same for the subsequent primitive processed, as described before. In other words, whenever different uncombined FSR values are encountered in the sequence, compared to the values for the previous primitive that was processed, the combined value can be calculated again. However, when the uncombined FSR values are the same as for the previous primitive processed, no such calculation is required—the last calculated value can be re-used.

The FSR logic 111 may be configured to only operate on sequences of primitives within the same draw call, for which the combination operation is commonly defined (i.e. by state information). This could simplify the FSR logic 111, as it need not consider changes to the combiner operation when determining whether a combined FSR value within a sequence of primitive will be the same as previously (i.e. because it would be known that the combiner operation, like the pipeline FSR value, will always be the same within the sequence).

As well as avoiding unnecessarily processing FSR combinations that can already be inferred, and thereby providing a more efficient system in that way, the graphics processing system 100 presented herein can also provide efficiency savings in terms of storage requirements.

As discussed above, transformed items of geometry (e.g. primitives) are provided from the primitive processing logic 109 to the primitive block assembly logic 113 which groups the items of geometry into blocks (which may be referred to as "primitive blocks") for storage. It was already explained that because primitives often share vertices with other primitives, storing the vertices for primitives in blocks allows the vertex data to be stored once in the block, wherein multiple primitives in the primitive block can reference the same vertex data in the block. In a similar way, it has been appreciated that, if a set of primitives each have the same combined FSR value, it can be efficient to explicitly store that one value and then associate the multiple primitives in the set with that same value. In other words, the primitive blocks can be stored with header data that identifies a particular FSR value, and the primitives represented by the data within that block are all understood to be associated with that particular FSR value. This one 'shared' FSR value can be stored in an uncompressed format, making it possible for the rendering logic to access the shared FSR value without having to incorporate additional decompression hardware compared to a system that does not support variable FSR values.

Figure 5A:
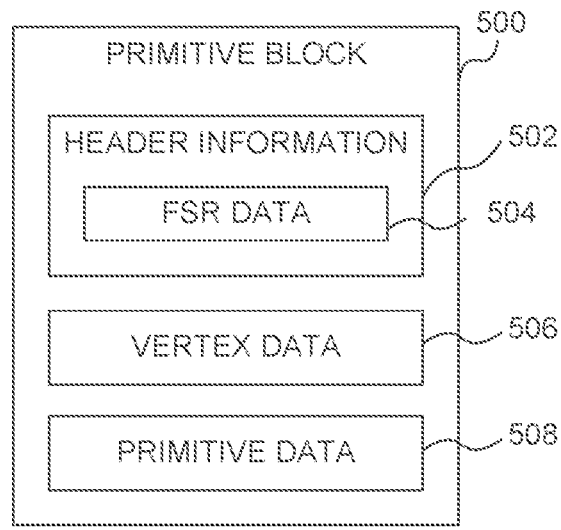
FIG. 5A shows an example primitive block.
Figure 6:
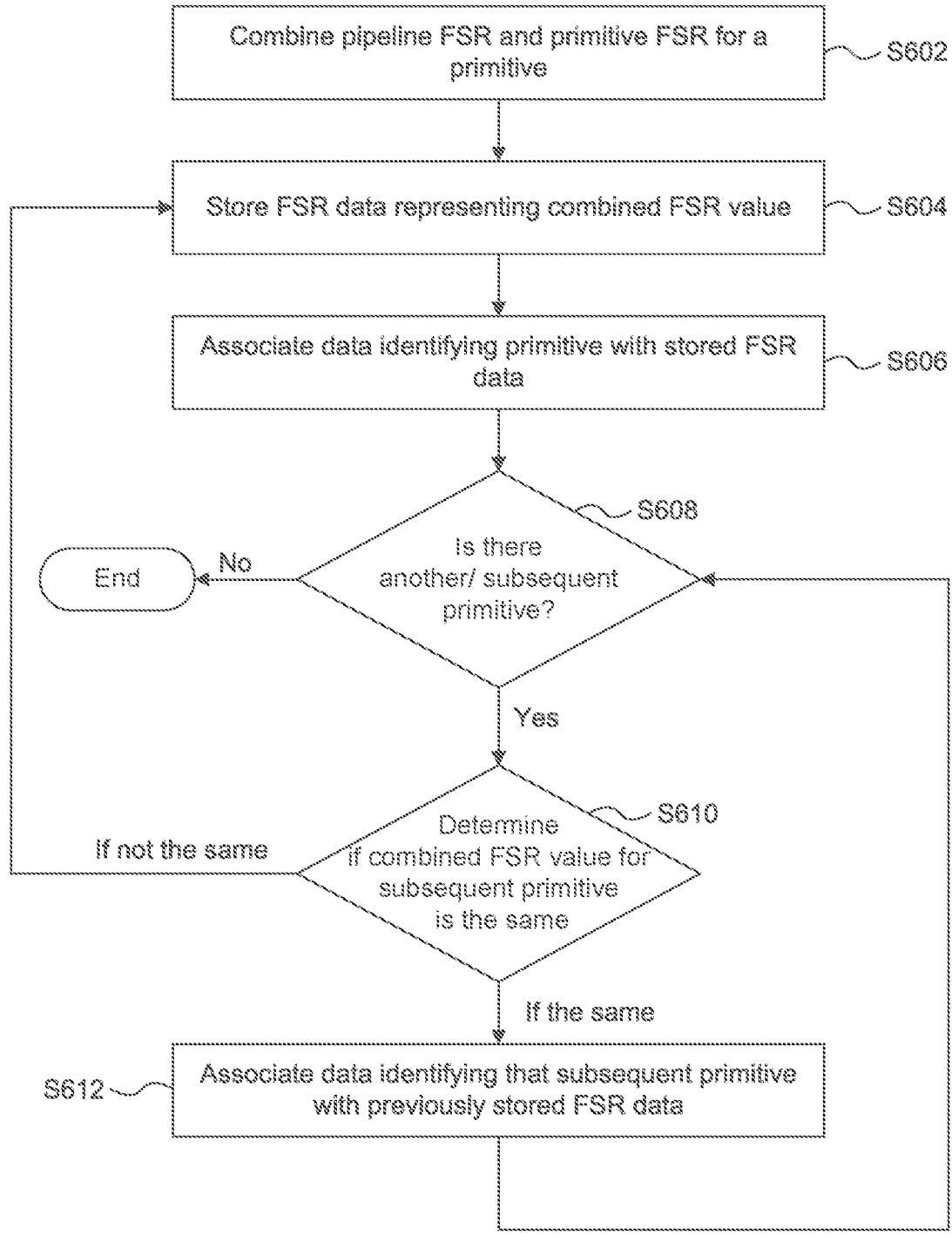
FIG. 6 shows a method of combining pipeline and primitive FSR values that can be performed by a graphics processing system such as that of FIG. 1.

FIG. 6 illustrates the steps of a method of combining and storing the FSR values. According to one implementation of the method, the primitive block assembly logic 113 can be configured to receive the transformed primitives and fragment shading rate data indicating their associated combined FSR values, and to store a sequence of primitives having the same combined FSR value in the same primitive block. FIG. 5A illustrates such a primitive block 500, which contains header information 502, vertex data 506 and primitive data 508. This illustration is to exemplify the present implementation only, and in practice a primitive block may contain other information and/or be arranged differently.

According to this implementation, a step S602 of combining the primitive FSR values and pipeline FSR values may have already occurred (e.g. the in the FSR logic 111) before primitive block assembly logic 113 receives the geometry information as part of the geometry processing logic 104. In other implementations, there may be no distinction between the FSR logic 11 and the primitive block assembly logic 113, such that a single unit may be considered to implement all the steps shown in FIG. 6 (and indeed, in yet other implementations there may be more units involved in implementing all the steps of FIG. 6).

In any case, when the first primitive is received by the primitive block assembly logic 113, a primitive block 500 is started and the fragment shading rate data 504 representing the combined FSR value is stored in the header information 502 of the primitive block 500, in accordance with step S604. The next step in FIG. 6, step S606, is to associate the data identifying the first primitive with the stored fragment shading rate data 504. In this implementation, that is achieved by storing the relevant vertex data 506 and primitive data 508 referencing the vertex data 506, to identify and define the particular primitive, in the primitive block 500. In other words, by virtue of the primitive being stored in that particular primitive block 500, it is known that it has the combined FSR value indicated by the data 504 stored in the header information 502 for that primitive block 500.

At step S608 in FIG. 6 it is determined whether there are any further primitives to process. If not, then that is the end of the process until further primitives are submitted to the system. Assuming that there is at least one further primitive, then at S610 a determination is made as to whether the next primitive has the same combined FSR value as for the last primitive (i.e. if it has the same combined FSR value as indicated by the fragment shading rate data 504 stored in the primitive block 500). As already explained, that determination may involve a full calculation of the combined FSR value or may rely on an inference based on the uncombined FSR values being the same as for the previous primitive. Again, in this implementation, this determination may be performed in the FSR logic 111, with the result of that determination provided to the primitive block assembly logic 113 to use in forming the primitive blocks, but other implementations are possible.

In any case, if the combined FSR value for the next primitive (i.e. the second primitive in this example) is the same as for the previous primitive, then at step S612 data identifying that next (i.e. second) primitive is associated with the fragment shading rate data 504. In this implementation, that is achieved by storing the data representing that next primitive in the same primitive block 500 that was previously created.

Steps S608 to S612 can be repeated for all subsequent primitives, until a primitive with a different combined FSR value is encountered at an iteration of step S610. At that point, as indicated in FIG. 6, the method can pass back to step S604, at which point further fragment shading rate data, representing the new combined FSR value, is stored. In the present implementation, that is achieved by starting a new primitive block and storing the further (i.e. new) fragment shading rate data in the header information of that new primitive block. The method can then continue back through step S604, with the data representing the primitive with the new combined FSR value being stored in the new primitive block, thereby associating the data identifying that primitive with the new stored fragment shading rate data. The whole method can be continued, creating new primitive blocks when required so that, in this implementation, each primitive block only contains primitives with a single combined FSR value. Put another way, in this implementation, all the primitives identified by the primitive block share the same combined FSR value, and so the FSR value for each primitive in the block can be determined easily during the rendering phase by referencing the data representing that value in the header of the primitive block.

Figure 5B:
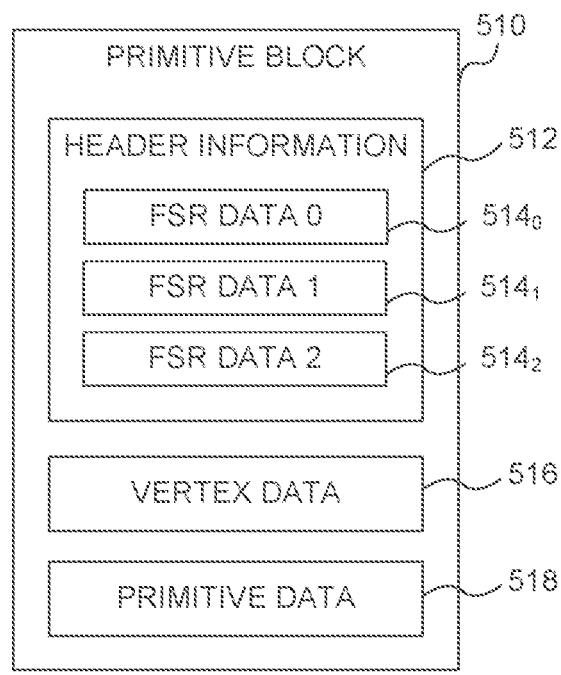
FIG. 5B shows an alternative example primitive block.

Although the preceding paragraphs have discussed one particular implementation, other implementations are possible. For example, rather than storing separate primitive blocks for different combined FSR values, a single primitive block might contain data regarding primitives with different FSR values. However, the advantages of the previous implementation could still be achieved by storing each combined FSR value in the primitive block header information once, and then storing an index for each primitive to indicate which particular FSR value is associated with that primitive. This is illustrated, by way of alternative, in FIG. 5B. The header information 512 of a primitive block 510 contains multiple pieces of fragment shading rate data $514_{0-2}$, indicative of different combined FSR values (N.B. although only three different pieces of fragment shading rate data are illustrated, this alternative implementation is not limited to that). In this way, primitive data 518 defining a primitive can reference the particular fragment shading rate data indicating the particular combined FSR value for that primitive, e.g. through an index, in a similar way to the manner in which the relevant vertices in the vertex data 516 are referenced. In this implementation, passing from step S610 to S604 in the FIG. 6 method may not require a new primitive block to be started. Instead, the further/new fragment shading rate data could be added to the same primitive block 510.

Returning to the previous consideration of the FSR logic 111, and as already mentioned, it may be the FSR logic 111 that provides an indication to the primitive block assembly logic 113 that the combined FSR value has changed from one primitive to the next. In the simple situation considered before, that indication could be provided whenever a primitive is encountered for which it is deemed necessary to perform a new calculation to determine a combined FSR. However, in some situations, it may be the case that the FSR logic 111 calculates a new combined FSR value, but that combined FSR value is actually the same value as the previous combined FSR value that was calculated. That is, different primitives with different primitive and/or different FSR values may have the same combined FSR value. It may also be the case that primitives from different sequences of primitives from different (but consecutive) draw calls have the same pipeline FSR values, primitive FSR values and combination operations. In such cases it could be desirable to store those primitives in the same primitive block. Indeed, it may even be the case that consecutive primitives from different draw calls have different FSR values and/or combination operations, but still have the same combined FSR value, and so could be stored in the same primitive block. For example, at the end of one draw call primitives may have had a 1×1 pipeline FSR value and a 2×2 primitive FSR value, with a combination operation that keeps the maximum (i.e. 2×2) FSR value. In that example, a following draw call might start with primitives that have a 2×2 pipeline FSR value and a 1×1 primitive FSR value, so a maximum combination operation would still arrive at the same (i.e. 2×2) combined FSR value. In other situations, the combination operation may also change whilst the combined FSR value remains the same—e.g. primitives with a 2×2 pipeline FSR value, a 1×1 primitive FSR value and a combination operation to keep the pipeline FSR value will have the same combined FSR value as primitives with a 4×4 pipeline FSR value, a 2×2 primitive FSR value and a combination operation to use the primitive FSR value. To take advantage of such situations, the FSR logic 111 may operate across draw calls, and may also take account of the combination operation changing (or otherwise) in determining whether the combined FSR value for a primitive is the same as previously calculated.

Even if the FSR logic 111 is configured to calculate a new combined FSR value whenever one of the primitive FSR value, pipeline FSR value or combiner operation changes, it can also be configured to check if that newly calculated combined FSR value has actually changed compared to the last calculate value. If no change has actually occurred, it may not be necessary for the primitive block assembly logic 113 to store data representing the newly calculated FSR value (i.e. the data for the relevant primitive can be associated with the previously stored FSR data). That can result in information for more primitives being stored in the same block, and thus increase the storage efficiency further.

Of course, the skilled person will understand that the graphics processing system 100 may start and end primitive blocks on the basis of other factors besides the combined FSR value. Whenever a new primitive block is started, it may be desirable to cause the combined FSR value to be calculated for the first primitive, before it is stored in the new primitive block.

Combining Attachment FSR

The previous section focussed on combining primitive and pipeline FSR sources. It might naively be assumed that it would make sense to combine the attachment FSR value with the values from those other sources at the same time (or immediately thereafter). However, in some scenarios, it may be the case that only one of primitive or pipeline FSR values are specified (and so they do not need to be combined with each other), or only attachment FSR values are provided. In any case, even if all sources of FSR values are present, the attachment FSR technique defines FSR values in a different way to the other sources, in terms of the rendering space rather than particular primitives. As such, in the type of graphics processing system illustrated in FIG. 1, with separate geometry processing logic 104 preceding separate rendering logic 106, it would require significant addition to the geometry processing logic 104 to determine the relevant attachment FSR value for each primitive at that stage. That is because it would require identifying the screen position of each primitive, to determine the corresponding attachment FSR value.

Therefore, it has been determined that is more efficient to store a first fragment shading rate for a primitive during a geometry processing phase and to delay combination with the attachment FSR value until the rendering phase. The first fragment shading rate may be a preliminary combined fragment shading rate, calculated combining pipeline and primitive FSR values for the primitive (e.g. as discussed in the previous section), or may be the pipeline or primitive FSR value for the primitive if only one of those was specified (although, in practice, dedicated hardware may still run the combination operation to determine a 'combined' FSR value that is the same as the single input FSR value). In the rendering phase, when the primitive has been processed to determine individual sampler fragments, the relevant attachment FSR value for a fragment can be determined and combined with the first FSR value for the primitive from which the fragment is derived. That results in a resolved combined FSR value, which can be the final FSR value used for shading the fragment.

Figure 7A:
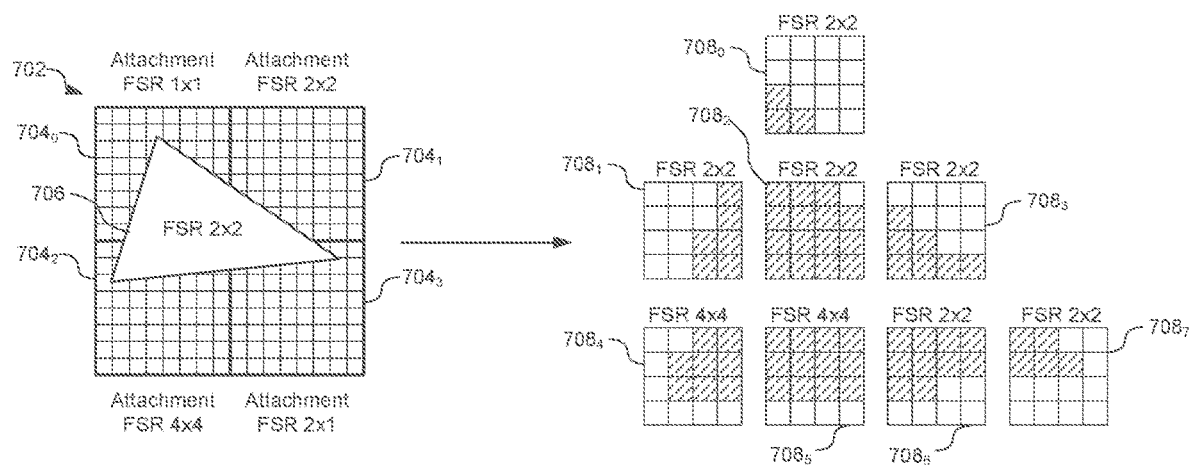
FIG. 7A illustrates how attachment FSR values can be determined for different fragments generated by sampling a primitive.
Figure 7B:
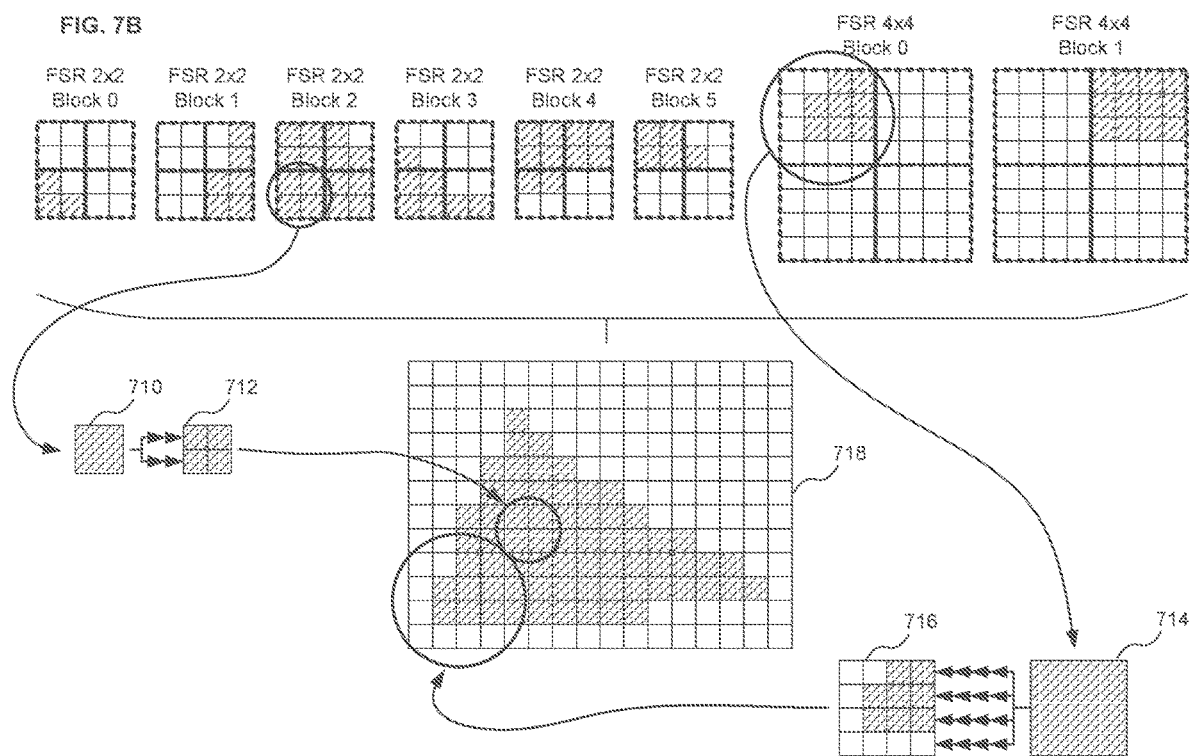
FIG. 7B illustrates how those fragments can subsequently be shaded.

FIGS. 7A and 7B illustrate (in a similar manner to how FIGS. 3 and 4 illustrated how a single FSR value interacts with a graphics processing system) how the attachment FSR technique interacts with other sources of FSR values in a graphics processing system.

In the example of FIGS. 7A and 7B, the attachment texel corresponds (or maps) to an area of 8×8 pixels, meaning that the rendering space is divided into a grid of 8×8 pixel areas, and an FSR value is specified for each such 8×8 pixel area. Those FSR values may be different or the same (although, in practice, if all the texels had the same FSR value, a larger FSR texel size would likely be more appropriate/efficient). FIG. 7A illustrates a portion 702 of a rendering space that contains four pixel areas 704$_{0-3}$, and in this example each pixel area corresponds to a different attachment texel that specifies a different FSR value (the attachment texel corresponding to pixel area 704$_0$ specifies an FSR value of 1×1; the attachment texel corresponding to pixel area 704$_1$ specifies an FSR value of 2×2; the attachment texel corresponding to pixel area 704$_2$ specifies an FSR value of 4×4; the attachment texel corresponding to pixel area 7043 specifies an FSR value of 2×1). The area of pixels corresponding to a particular FSR texel or value may also be referred to as an FSR region.

A triangular primitive 706 overlaps the four pixel areas 704$_{0-3}$. The primitive 706 is associated with its own FSR value, which in this case is a 2×2 FSR value. This could be the 'first FSR value' mentioned above. In any case, the FSR value associated with the primitive is combined with the attachment FSR value during the sampling process for the primitive. In this case, as illustrated in FIG. 7A, although the attachment texels correspond to pixel areas of 8×8 pixels, the microtile size is still 4×4 samples, and so the primitive 706 is found to overlap eight microtiles 708$_{0-7}$ (and the sample coverage of the primitive 706 within each microtile is indicated by cross hatching). In turn, each microtile overlaps a pixel area corresponding to a particular attachment texel, associated with a particular attachment FSR value. For the sampler fragments within each microtile, a resolved combined FSR value (i.e. which might be a 'second' combined FSR value if the primitive's FSR value was a first, preliminary, combined value derived from combining pipeline and primitive FSR values) can be calculated based on the FSR value associated with the primitive and the FSR value of the attachment texel corresponding to the pixel area that the microtile is overlapping. So, for sampler fragments in microtile 708$_0$, derived from pixel area 704$_0$, the attachment FSR value is 1×1. In this example the combination operation for the attachment FSR value and the FSR value associated with the primitive is a 'maximum' combiner, so the FSR value for the for the sampler fragments in microtile 708$_0$ is 2×2 (being the FSR value associated with the primitive 706, which is larger than the 1×1 FSR value of the corresponding attachment texel). With similar reasoning it can be understood how the other FSR values shown in FIG. 7A for the sampler fragments in each of the eight microtiles 708$_{0-7}$ are derived. It can be seen that for many of the microtiles the resulting FSR value for the sampler fragments they contain is 2×2, but two microtiles 708$_4$ & 708$_5$ have an FSR value of 4×4 for the sampler fragments they contain.

It is noted that although the forgoing description relates the position of the microtiles to the attachment texels, to determine the relevant attachment FSR, in other implementations it may be the positions of the fragments themselves which are considered with respect to the attachment texels.

FIG. 7B continues the rasterisation process started in FIG. 7A. Based on the FSR values, sampler fragments from the microtiles 708$_{0-7}$ illustrated in FIG. 7A are grouped into blocks of shader fragments for shading in parallel. The five microtiles with FSR values of 2×2 (microtiles 708$_{0-3}$ and 708$_{6-7}$) are converted to FSR 2×2 Blocks 0-5 in FIG. 7B. As in FIGS. 3 and 4, a dashed box is shown around each shader fragment in each of the blocks. In addition, the two microtiles with the 4×4 FSR value (microtiles 708$_4$ & 708$_5$) are converted to FSR 4×4 Blocks 0 & 1 in FIG. 7B. Again a dashed box is shown around each shader fragment within that block.

As previously discussed with respect to FIGS. 3 and 4, a single shader task instance is run for each dashed box. As shown for one of the dashed boxes from FSR 2×2 Block 2, this produces a single shading result 710 corresponding to the original sampler fragments for which the task instance was constructed. That single shading result 710 can then be recombined with the coverage information from original microtile 7082 to produce a set of appropriately shaded fragments 712 at the same spatial resolution as the original set of 2×2 sampler fragments. In this case, all four of the sample points to which the task instance corresponds are found to be covered by the primitive, so four shaded fragments are obtained. In contrast, one of the dashed boxes from FSR 4×4 Block 0 is shown to produce a single shading result 714 corresponding to 16 sample points that were not all covered by the primitive for which the task instance was constructed. In this case the primitive only covered eight of the 16 sample points to which the task instance corresponded, so when the single shading result 714 is recombined with the coverage information from original microtile 708$_4$ it produces eight fragments shaded in accordance with the single shading result 714, but at the spatial resolution of the original sampler fragments. After performing a similar process for each task instance, the shaded fragments can be combined to form the output 718.

It will be understood that although, compared to FIGS. 3 and 4, the introduction of the attachment FSR technique opens up the possibility of different FSR values for different parts of the same primitive, once the FSR values for individual fragments have been determined the process is much the same as previously described. In other words, although the coarser fragment size (compared to shading each sample point individually) causes sampler fragments to be grouped together to be shaded, in a way that can also cover sample points which may not actually be covered by the primitive being shaded, the shading results 710 and 714 are applied only at the sample positions known to be covered. This means, fewer task instances need to be processed to achieve the shading output, leading to greater processing efficiency.

Returning to the system of FIG. 1, it was previously described that fetched transformed primitives are provided to the sampling unit 117 which performs the sampling and determines the primitive fragments to be shaded. As part of determining the primitive fragments to be shaded, the sampling unit 117 removes primitive fragments which are hidden (e.g. hidden by other primitive fragments). Primitive fragments which are not removed by the HSR logic 118 of the sampling unit 117 are provided (e.g. as microtiles) to the texturing/shading unit 120, which applies texturing and/or shading to primitive fragments.

As such, to incorporate attachment FSR, the parameter fetch unit 116 also retrieves the attachment containing the FSR information from the graphics memory 122, as shown in FIG. 1. The parameter fetch unit 116 then passes the FSR information from the attachment to the sampling unit 117 (along with the control stream data and transformed primitives indicated by the control stream data, as previously described). The sampling unit 117 contains attachment FSR logic 119. The attachment FSR logic 119 is configured to combine (based on a combination operation originally submitted to the system as state information) an FSR value associated with a primitive fragment (e.g. an FSR value stored in a primitive block containing the primitive information as described above, which may be a combination of pipeline and primitive FSR values) with an attachment FSR value.

This arrangement, of having the parameter fetch unit 116 retrieve the attachment and having the sampling unit 117 process the attachment information (i.e. combine the attachment FSR values with the other FSR values), may seem unintuitive. That is, it might be assumed that it would be preferable for the sampling unit 117 to directly retrieve the attachment itself, or for the parameter fetch unit 116 to process the attachment FSR values after it has retrieved the attachment. However, the described arrangement takes advantage of the fact that the sampling unit 117 may itself contain multiple parallel processing units or pipelines. That is, it would be inefficient for each of the parallel pipelines within the sampling unit 117 to separately fetch the required attachment information, as this could result in the same attachment being read from the memory multiple times. On the other hand, the sampling unit 117 is already configured to handle sampling the geometry, and so can efficiently incorporate the additional considerations introduced by the attachment FSR values. In contrast, the parameter fetch unit 116 can retrieve the attachment and provide the FSR information to all the pipelines within the sampling unit 117 at once, but is not configured to handle geometry sampling and so it would not be efficient to adapt that unit to handle processing the attachment FSR values. As such, the described arrangement is the most efficient way of handling the attachment FSR information. In other words, it is advantageous for the rendering logic 106 to use attachment FSR values multiple times based on a single retrieval of the attachment information from the graphics memory 122. Still, in other implementations the position of the attachment FSR logic may be different.

When it comes to determining the correct attachment FSR value for fragments derived from a primitive, the attachment FSR logic 119 in the rendering logic 106 is configured to determine the position of the sampler fragment within the tile and the mapping to the corresponding attachment FSR texel. The skilled person will understand that determining the position of a fragment within the render space is part of the ordinary function of the rendering logic 119, and so that is not discussed in detail here.

Figure 8A:
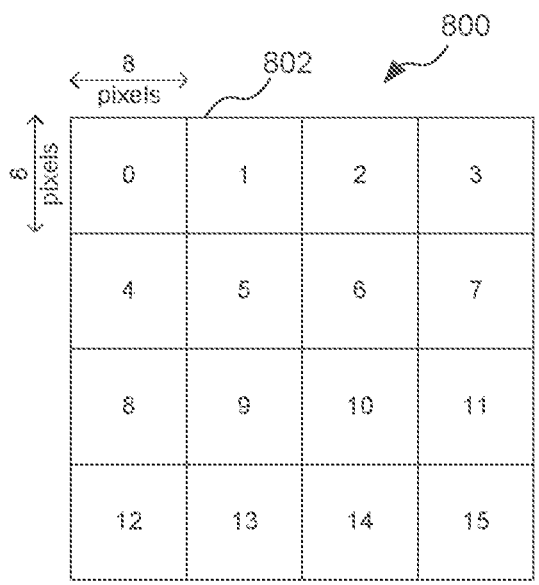
FIG. 8A illustrates how 16 attachment FSR texels may correspond to the pixels of one tile.
Figure 8B:
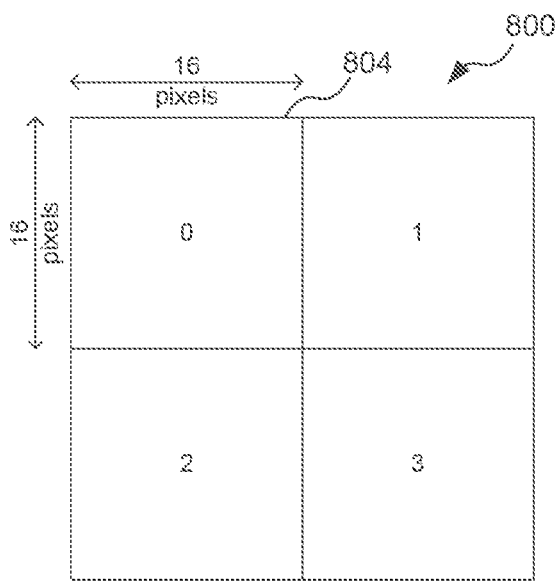
FIG. 8B illustrates how four attachment FSR texels may correspond to the pixels of one tile.

The FSR attachment indicates a texel size and an attachment FSR value for each texel. Example texel sizes may be 8×8, 16×16, 32×32, 64×64, 128×128 and 256×256 pixels, although other values may be used—the particular values available will depend on the system. Considering a system with a minimum FSR texel size of 8×8 and a maximum tile size of 32×32 pixels, it can be understood that there may be up to 16 FSR texels that map to the area of one tile. This is illustrated in FIG. 8A, showing how a tile 800 of size 32×32 pixels may be divided into 16 areas 802 (labelled with indices 0 to 15) of size 8×8 pixels, with each 8×8 pixel area corresponding to one 8×8 FSR texel. The number of FSR texels corresponding to tile 800 cannot be greater in this example. However, the number of FSR texels corresponding to tile 800 may be smaller. FIG. 8B illustrates how a tile 800 of size 32×32 pixels may be divided into just 4 areas 804 (labelled with indices 0 to 3) of size 16×16 pixels, with each 16×16 pixel area corresponding to one 16×16 FSR texel. Similarly FIG. 8C illustrates how a tile 800 of size 32×32 pixels may correspond to a single pixel area 806 (labelled with index 0) corresponding to an FSR texel of size 32×32 pixels.

Figure 8C:
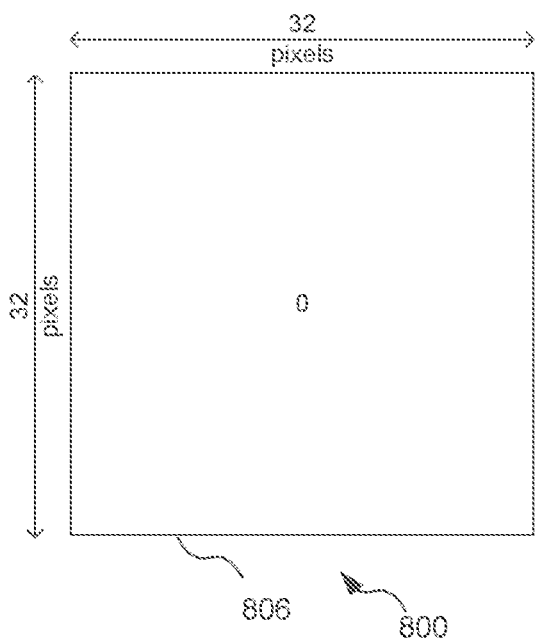
FIG. 8C illustrates how one attachment FSR texel may correspond to the pixels of one tile and FIG. 8D illustrates how four tiles may correspond to one attachment FSR texel.

Although the examples of FIGS. 8A-C all show the same tile size, other tile sizes and shapes are possible, and the skilled person will understand that the number of FSR texels corresponding to the pixel areas within a tile will not only depend on the size of the FSR texel but also the size of the tile. It will also be understood that whilst tile size within a particular system may not vary in terms of the sample coverage, there may be tiles of different pixel size/coverage due to some tiles requiring anti-aliasing. For example, a system with a 'normal' tile size of 32×32 pixels may also use tiles of 32×16 pixels (e.g. tiles 32 pixels wide and 16 pixels high) in size when operating with an anti-aliasing setting requiring twice as many samples per pixel in the height as in the width. In that case both 'normal' and anti-aliasing tiles have the same dimensions when considering the number of samples (i.e. 32×32) and hence hold equivalent amounts of data, but as there is not a one-to-one correspondence between the number of samples and the number of pixels in the anti-aliasing tiles they have different pixel dimensions to 'normal' (without anti-aliasing) tiles. In this example, the anti-aliasing tiles would only map to 8 FSR texels of pixel size 8×8 whilst 'normal' tiles would map to 16 FSR texels.

Figure 8D:
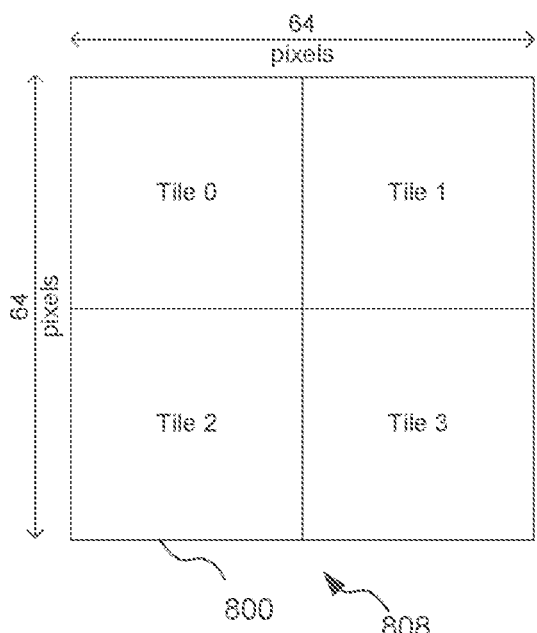

Further, as shown in FIG. 8D, it may be the case that the FSR texel maps to an area bigger than a single tile. FIG. 8D shows how an FSR texel of size 64×64 pixels may correspond to a pixel area 808 that covers four tiles 800 of size 32×32 pixels. In this situation, each of Tiles 0-3 have a single attachment FSR region, in a similar way to the FIG. 8C situation, it is just that (when considering a single tile) the single attachment FSR region in the tile is smaller than the overall attachment FSR texel.

It will therefore be understood that the number of different attachment FSR regions in a tile can vary, being one at a minimum (assuming attachment FSR is in use), and with a maximum number of regions determined by the maximum tile size and the minimum FSR texel size. Taking the previous example of a system with a FSR texel sizes of 8×8, 16×16, 32×32, 64×Γ, 128×128 and 256×256 pixels, FIGS. 9A-E show examples of how different FSR regions may be present in different tiles based on a fixed tile size of 32×32 samples.

Figure 9A:
FIG. 9A illustrates how 16 attachment FSR regions may be present in one tile.

FIG. 9A shows a similar situation to FIG. 8A-16 different FSR regions can occur when a tile corresponds to 32×32 pixels, and the FSR texel size is the minimum of 8×8 pixels.

Figure 9B:
FIG. 9B illustrates how eight attachment FSR regions may be present in one tile.

FIG. 9B shows the situation previously discussed but not illustrated, wherein a tile can correspond to 32×16 pixels due an anti-aliasing setting requiring only one sample per pixel in the width direction but two samples per pixel in the height direction, and the FSR texel size is still the minimum of 8×8 pixels.

Figure 9C:
FIG. 9C illustrates how four attachment FSR regions may be present in one tile.
Figure 9D:
FIG. 9D illustrates how two attachment FSR regions may be present in one tile.
Figure 9E:
FIG. 9E illustrates how one attachment FSR region may be present in one tile and FIG. 9F illustrates how a register may be arranged to store attachment FSR values corresponding to different attachment FSR regions of a tile.

FIGS. 9C-9E show situations that can occur as either the FSR texel size increases or the anti-aliasing sample rate is increased.

For example, FIG. 9C could illustrate the different FSR regions when an anti-aliasing setting requires two samples per pixel in both the height and width directions, but still using the minimum 8×8 FSR texel size. Alternatively it could illustrate a situation in which there is no anti-aliasing, but the FSR texel size has increased to 16×16 pixels.

FIG. 9D could illustrate the different FSR regions when using an anti-aliasing setting requiring only one sample per pixel in the width direction but two samples per pixel in the height direction, but with an FSR texel size increased to 16×16 pixels. Alternatively, it could illustrate a situation in which the FSR texel size is still only 8×8 pixels, but for which the anti-aliasing rates have been doubled compared to FIG. 9B—i.e. requiring two samples per pixel in the width direction and four samples per pixel in the height direction.

FIG. 9E could illustrate the different FSR regions when an anti-aliasing setting requires four samples per pixel in both the width and height directions, in combination with an 8×8 pixel FSR texel size. Alternatively it could represent the use of a 16×16 pixel FSR texel in combination with an anti-aliasing setting requiring two samples per pixel in both the width and height directions. Further, it could represent the use of a single 32×32 FSR texel in combination with no anti-aliasing (similar to FIG. 8C). Still further, it could represent a tile mapping to an area that falls entirely within a larger FSR texel (e.g. at 64×64, 128×128 or 256×256 FSR texel).

It will be apparent from the foregoing discussion of FIGS. 9A-E that the determination of which attachment FSR texel is relevant to a particular area of a tile cand depend on a number of factors such as the maximum tile size, the number of possible FSR texel sizes and the available anti-aliasing rates. For example, the discussion of FIGS. 9A-E only considers available anti-aliasing settings in which the sampling rates in the height and width direction are the same or for which the sampling rate in the height direction is double that in the width, up to a maximum of four samples per pixels in both directions. Other systems may have other anti-aliasing settings (e.g. allowing greater sampling in the width compared to the height). However, for a given system, those factors are known, and the various possible combinations of FSR regions within a tile, such as the combinations shown in FIGS. 9A-E for the example system, can be determined. Moreover, by providing an index to each FSR region in each of the combinations (an example of which is also shown by the numbering within the regions in FIGS. 9A-E) it becomes possible to reference the relevant attachment FSR region for a position in the tile.

As such, when the sampling unit 117 performs the sampling to determine the primitive fragments, and creates the microtiles to issue to the texturing/shading unit 120, it can determine the location of a fragment in the tile and use the appropriate attachment FSR region index to retrieve the corresponding attachment FSR value for the appropriate attachment FSR texel.

Figure 9F:
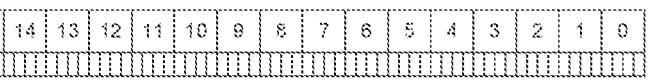

For example, when processing a particular tile, the sampling unit 117 can determine the attachment FSR regions in the tile and store the corresponding attachment FSR values from the relevant attachment FSR texels in a register. Such a register, is illustrated in FIG. 9F (for the example system previously described in connection with FIGS. 9A-E), being 64 bits in size, corresponding to 4 bits for each of the 16 possible indices for a tile. With such an arrangement, whatever the division of attachment FSR regions is determined for the particular tile being processed, the corresponding attachment FSR value for those regions can be stored in the lowest bits of the register (i.e. filling all the bits of the register when there are 16 attachment FSR regions within the tile). Then, before issuing a microtile to texturing/shading unit 120, the sampling unit 117 can, for each fragment within the microtile, retrieve the relevant FSR value from the register and combine it with the FSR value associated with the primitive from which the fragment is derived (e.g. the previously described first FSR value stored in the primitive block from which the primitive was retrieved). In other implementations, knowing that the fragments within a microtile will have the same first FSR value and will fall within the same attachment FSR region within the tile, the calculation of the combination of the first FSR value and the attachment FSR value may be performed once and associated with each of the fragments in the microtile.

Figure 10:
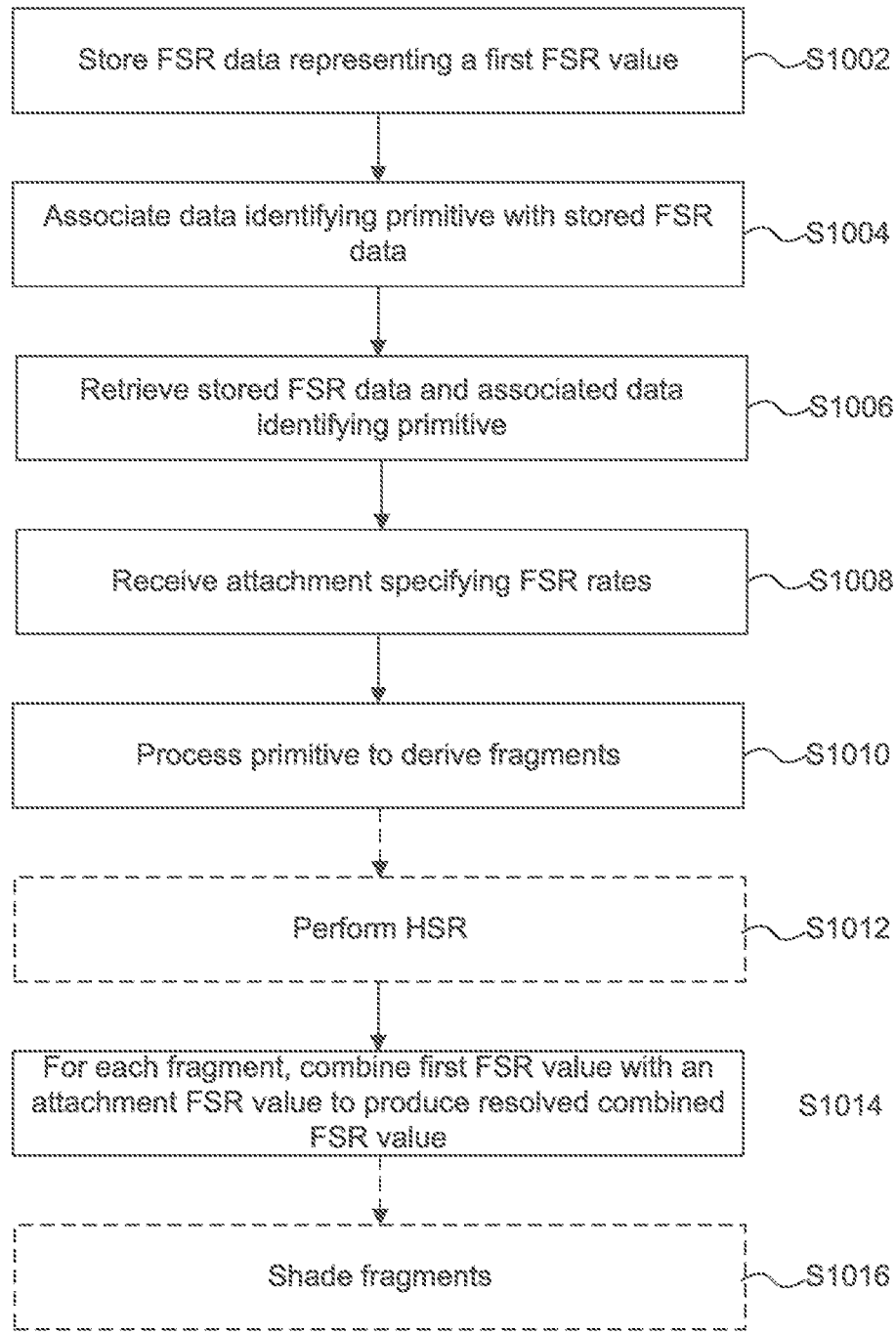
FIG. 10 shows a method of combining a first FSR value for a primitive with an attachment FSR value, which can be performed by a graphics processing system such as that of FIG. 1.

FIG. 10 shows a method outlining how attachment FSR values may be processed. The method starts, in step S1002, by storing FSR data representing a first FSR value and associating, in step S1004, data identifying a primitive with that stored FSR data. As discussed the first FSR value may be the combination of the primitive and pipeline FSR values for that primitive. As such, these two steps may correspond to steps S604 and S605 of FIG. 6. In other words, these steps may be performed by geometry processing logic 104, during a geometry processing phase.

In step S1006 of FIG. 10, that stored FSR data and data identifying the primitive is retrieved, for example by the parameter fetch unit 116. In other words, from this step onwards, the method of FIG. 10 may be performed by rendering logic 106, during a rendering phase. That is, in the example system of FIG. 1, these steps may only be performed after the primitive information has been stored in a primitive block.

At step S1008, the attachment specifying the FSR rates is obtained. As a result, a further (compared to the stored FSR data) FSR value is obtained for each of one or more regions of the rendering space. As previously discussed, the parameter fetch unit 116 could retrieve the FSR attachment from memory and provide it to the sampling unit 117, or in other implementations the sampling unit 117 could obtain the FSR attachment directly from memory. This method step may actually occur at any stage in the method before S1014 (described below), in which the FSR values are used.

At step S1010, the primitive is processed to derive fragments. In other words, sampling/scan conversion/rasterisation is performed to determine the sample points that the primitive covers. As previously discussed, this can be performed by sampling unit 117. In a deferred rendering system, sampling unit 117, specifically HSR logic 118, may also then perform hidden surface removal step S1012, to remove fragments determined not to be visible in the rendered scene.

At step S1014, for each fragment (being the fragments from step S1010, or only those remaining after hidden surface removal if S1012 is performed), the first FSR value is combined with an attachment FSR value to produce a resolved combined FSR value for that fragment. As previously discussed, this may be performed by FSR logic 1111 in sampling unit 117. As also previously discussed, different fragments from the same primitive may be combined with different attachment FSR values to produce (groups of) fragments with different resolved combined FSR values.

Finally, at step S1016, having determined the resolved combined FSR value for each fragment, the fragments may be shaded, e.g. by texturing/shading unit 120. This is shown as an optional step (i.e. using a dashed box) because it is not essential to the preceding method of determining the resolved combined FSR value(s).

Figure 11:
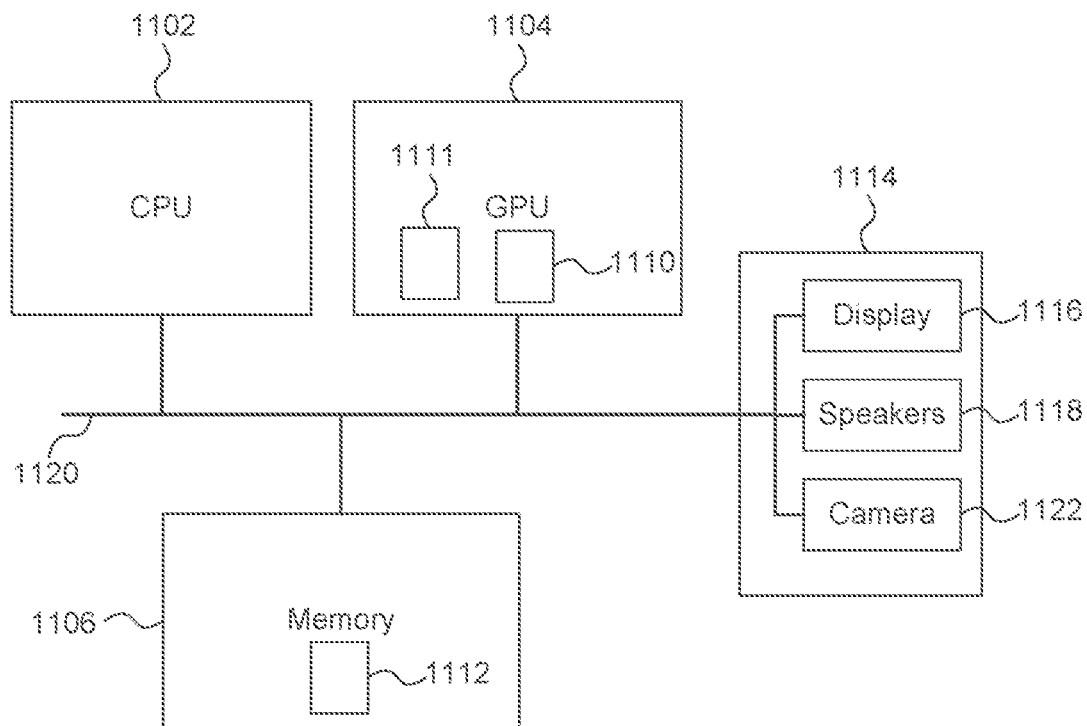
FIG. 11 shows a computer system in which a graphics processing system is implemented.

FIG. 11 shows a computer system in which the graphics processing systems described herein may be implemented. The computer system comprises a CPU 1102, a GPU 1104, a memory 1106 and other devices 1114, such as a display 1116, speakers 1118 and a camera 1122. One or more processing blocks 1110 (e.g. corresponding to processing blocks 104 and 106) can implemented on the GPU 1104, as well as a Neural Network Accelerator (NNA) 1111. In other examples, the processing block(s) 1110 may be implemented on the CPU 1102 or within the NNA 1111. The components of the computer system can communicate with each other via a communications bus 1120. A store 1112 (corresponding to memory 102) is implemented as part of the memory 1106.

While FIG. 11 illustrates one implementation of a graphics processing system, it will be understood that a similar block diagram could be drawn for an artificial intelligence accelerator system—for example, by replacing either the CPU 1102 or the GPU 1104 with a Neural Network Accelerator (NNA) 1111, or by adding the NNA as a separate unit. In such cases, again, the processing block(s) 1110 can be implemented in the NNA.

The graphics processing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 12.

Figure 12:
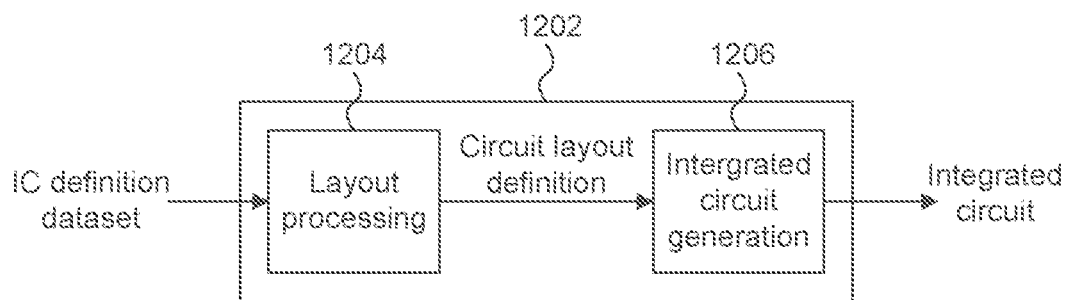
FIG. 12 shows an integrated circuit manufacturing system for generating an integrated circuit embodying a graphics processing system.

FIG. 12 shows an example of an integrated circuit (IC) manufacturing system 1202 which is configured to manufacture a graphics processing system as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1202 to manufacture an integrated circuit embodying a graphics processing system as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rendering a scene formed by primitives in a graphics processing system, the method comprising, for a sequence of primitives:
combining a pipeline fragment shading rate value and a primitive fragment shading rate value for a primitive to produce a combined fragment shading rate value for the primitive;
storing fragment shading rate data representing the combined fragment shading rate value for the primitive and associating vertex data of the primitive with the fragment shading rate data;
determining, for a subsequent primitive, if a combined fragment shading rate value for the subsequent primitive is the same as for the preceding primitive, and
if the combined fragment shading rate value for the subsequent primitive is the same as for the preceding primitive, associating vertex data of the subsequent primitive with the fragment shading rate data that the vertex data of the preceding primitive is associated with, and repeating the determining step for a next subsequent primitive, if there is one; and,
if the combined fragment shading rate value for the subsequent primitive is not the same as for the preceding primitive, storing further fragment shading rate data representing the combined fragment shading rate value for the subsequent primitive and associating vertex data of the subsequent primitive with the further fragment shading rate data; and repeating the determining step for a next subsequent primitive, if there is one.

2. The method of claim 1, wherein the primitives in the sequence of primitives have the same pipeline fragment shading rate value, and the step of determining further comprises identifying that the primitive fragment shading rate value is different for the subsequent primitive and the preceding primitive.

3. The method of claim 1, wherein the step of determining further comprises calculating a combined fragment shading rate value for the subsequent primitive.

4. The method of claim 3, wherein the step of determining further comprises checking if the calculated combined fragment shading rate value for the subsequent primitive differs from the combined fragment shading rate value for the preceding primitive.

5. The method of claim 1, wherein a combined shading rate value is calculated from a pipeline fragment shading rate value and primitive fragment shading rate value by any one of the following combination operations: selecting a particular one of the pipeline fragment shading rate value and primitive fragment shading rate value, selecting the maximum or minimum of the pipeline fragment shading rate and the primitive fragment shading rate values, multiplying together the pipeline fragment shading rate value and the primitive fragment shading rate value, or performing any other mathematical operation on the pipeline fragment shading rate value and primitive fragment shading rate value.

6. The method of claim 5, wherein different combination operations may be used for different primitives to calculate their respective combined fragment shading rate value.

7. The method of claim 1, wherein storing fragment shading rate data comprises creating a primitive block and storing the fragment shading rate data as header data in the primitive block.

8. The method of claim 7, wherein associating vertex data of a primitive with the fragment shading rate data comprises storing vertex data of the primitive in the primitive block having the fragment shading rate data as header data.

9. The method of claim 1, wherein the graphics processing system is configured to use a rendering space that is subdivided into a plurality of regions.

10. The method of claim 9, wherein the primitive and subsequent primitives at least partially cover a same one of the plurality of regions.

11. A graphics processing system configured to render a scene formed by primitives, wherein the graphics processing system comprises geometry processing logic configured to:
  combine a pipeline fragment shading rate value and a primitive fragment shading rate value for a primitive in a sequence of primitives to produce a combined fragment shading rate value for the primitive;
  store fragment shading rate data representing the combined fragment shading rate value for the primitive and associating vertex data of the primitive with the fragment shading rate data;
  determine, for a subsequent primitive, if a combined fragment shading rate value for the subsequent primitive is the same as for the preceding primitive, and
  if the combined fragment shading rate value for the subsequent primitive is the same as for the preceding primitive, associate vertex data of the subsequent primitive with the fragment shading rate data that the vertex data of the preceding primitive is associated with, and repeat the determining step for a next subsequent primitive, if there is one; and
  if the combined fragment shading rate value for the subsequent primitive is not the same as for the preceding primitive, store further fragment shading rate data representing the combined fragment shading rate value for the subsequent primitive and associate vertex data of the subsequent primitive with the further fragment shading rate data; and repeat the determining step for a next subsequent primitive, if there is one.

12. The system of claim 11, wherein the primitives in the sequence of primitives have the same pipeline fragment shading rate value, and wherein the processing logic configured to determine if a combined fragment shading rate value for the subsequent primitive is the same as for the preceding primitive further comprises processing logic configured to identify that the primitive fragment shading rate value is different for the subsequent primitive and the preceding primitive.

13. The system of claim 11, wherein the processing logic calculates a combined shading rate value from a pipeline fragment shading rate value and primitive fragment shading rate value by any one of the following combination operations: selecting a particular one of the pipeline fragment shading rate value and primitive fragment shading rate value, selecting the maximum or minimum of the pipeline fragment shading rate and the primitive fragment shading rate values, multiplying together the pipeline fragment shading rate value and the primitive fragment shading rate value, or performing any other mathematical operation on the pipeline fragment shading rate value and primitive fragment shading rate value.

14. The system of claim 11, wherein the processing logic is configured to store fragment shading rate data by creating a primitive block and storing the fragment shading rate data as header data in the primitive block, and wherein the processing logic is configured to associate vertex data of a primitive with the fragment shading rate data by storing vertex data of the primitive in the primitive block having the fragment shading rate data as header data.

15. The system of claim 11, wherein the graphics processing system is embodied in hardware on an integrated circuit.

16. A method of manufacturing, using an integrated circuit manufacturing system, a graphics processing system by inputting to said integrated circuit manufacturing system an integrated circuit definition dataset that, when processed in said integrated circuit manufacturing system, configures the integrated circuit manufacturing system to manufacture the graphics processing system as set forth in claim 11.

17. A non-transitory computer readable storage medium having stored thereon computer readable code configured to cause the method of claim 1 to be performed when the code is run.

18. A non-transitory computer readable storage medium having stored thereon an integrated circuit definition dataset that, when processed in an integrated circuit manufacturing system, configures the integrated circuit manufacturing system to manufacture a graphics processing system as set forth in claim 11.

19. An integrated circuit manufacturing system configured to manufacture a graphics processing system as set forth in claim 11.

* * * * *